United States Patent
Park et al.

(10) Patent No.: US 12,232,162 B2
(45) Date of Patent: Feb. 18, 2025

(54) METHOD AND APPARATUS FOR SIMULTANEOUS TRANSMISSION OF UPLINK INFORMATION IN WIRELESS COMMUNICATION SYSTEM

(71) Applicant: Samsung Electronics Co., Ltd., Suwon-si (KR)

(72) Inventors: Sungjin Park, Suwon-si (KR); Hyunseok Ryu, Suwon-si (KR); Cheolkyu Shin, Suwon-si (KR); Junyung Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 17/697,327

(22) Filed: Mar. 17, 2022

(65) Prior Publication Data
US 2022/0312427 A1 Sep. 29, 2022

(30) Foreign Application Priority Data
Mar. 18, 2021 (KR) .................. 10-2021-0035365

(51) Int. Cl.
*H04W 72/56* (2023.01)
*H04L 1/1812* (2023.01)
(Continued)

(52) U.S. Cl.
CPC ........... *H04W 72/56* (2023.01); *H04L 1/1812* (2013.01); *H04L 5/0053* (2013.01); *H04W 72/0446* (2013.01); *H04W 72/21* (2023.01)

(58) Field of Classification Search
None
See application file for complete search history.

(56) References Cited

U.S. PATENT DOCUMENTS

2018/0084540 A1* 3/2018 Takeda .................. H04L 5/0044
2021/0243779 A1* 8/2021 Takeda .............. H04W 72/0453
(Continued)

FOREIGN PATENT DOCUMENTS

KR 10-2021-0085456 A 7/2021
WO 2020/168351 A1 8/2020
(Continued)

OTHER PUBLICATIONS

VIVO; Intra-UE Multiplexing/Prioritization for Rel-17 URLLC; 3GPP TSG RAN WG1 #104-e; R1-2100439; Jan. 25-Feb. 5, 2021; e-Meeting.
(Continued)

*Primary Examiner* — Adnan Baig
(74) *Attorney, Agent, or Firm* — Jefferson IP Law, LLP

(57) ABSTRACT

A method is provided. The method includes receiving, from a base station, information associated with simultaneous physical uplink control channel (PUCCH) and physical uplink shared channel (PUSCH) transmission, identifying that a PUCCH with a first priority index and a PUSCH with a second priority index overlap in a time domain, and in case that the first priority index is different from the second priority index, transmitting, to the base station, uplink control information (UCI) via the PUCCH and uplink data via the PUSCH, based on the information associated with the simultaneous PUCCH and PUSCH transmission.

8 Claims, 12 Drawing Sheets

(51) Int. Cl.
*H04L 5/00* (2006.01)
*H04W 72/0446* (2023.01)
*H04W 72/21* (2023.01)

(56) References Cited

U.S. PATENT DOCUMENTS

| | | | | |
|---|---|---|---|---|
| 2022/0217709 A1* | 7/2022 | Yang | ............... | H04L 5/0053 |
| 2022/0386331 A1* | 12/2022 | Aiba | ............... | H04W 72/23 |
| 2023/0284224 A1* | 9/2023 | Takahashi | ............ | H04W 72/54 |
| | | | | 370/329 |

FOREIGN PATENT DOCUMENTS

| WO | 2020/206226 A1 | 10/2020 |
|---|---|---|
| WO | 2021/137554 A1 | 7/2021 |

OTHER PUBLICATIONS

Mediatek Inc.; Methods for Intra-UE Multiplexing and Prioritization; 3GPP TSG RAN WG1 Meeting #104-e; R1-2100577; Jan. 25-Feb. 5, 2020; e-Meeting.

OPPO; Enhancements on intra-UE multiplexing/prioritization; 3GPP TSG RAN WG1 #104-e; R1-2100184; Jan. 25-Feb. 5, 2021; e-Meeting.

International Search Report and Written Opinion dated Jun. 22, 2022; International Appln. No. PCT/KR2022/003571.

* cited by examiner

METHOD AND APPARATUS FOR SIMULTANEOUS TRANSMISSION OF UPLINK INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0035365, filed on Mar. 18, 2021, in the Korean Intellectual Property Office, the disclosure of which is incorporated by reference herein in its entirety.

BACKGROUND

1. Field

The disclosure relates to a method and apparatus for simultaneously transmitting uplink signals in a wireless communication system.

2. Description of Related Art

To meet the ever-increasing demand with respect to wireless data traffic since the commercialization of the 4th generation (4G) communication system, there have been efforts to develop an advanced 5th generation (5G) system or pre-5G communication system. For this reason, the 5G or pre-5G communication system is also called a beyond 4th generation (4G) network communication system or post long term evolution (LTE) system. The 5G communication system defined by the 3rd Generation Partnership Project (3GPP) is called a new radio (NR) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultra-frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid frequency shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies. With the development of the aforementioned technologies and wireless communication systems, there is a need for a method of efficiently transmitting or receiving control channels and data channels in particular.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for simultaneously transmitting uplink signals by taking into account priorities of control channels and data channels in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes reporting UE capability for simultaneous transmission of one or more uplink (UL) signals scheduled to overlap in time domain to a base station (BS), receiving resource allocation information and priority information for a plurality of UL signals from the BS, identifying based on the resource allocation information whether a plurality of resources for the plurality of UL signals overlap in the time domain, and transmitting the plurality of UL signals to the BS at the same time based on the priority information and the UE capability when the plurality of resources overlap in the time domain.

In accordance with another aspect of the disclosure, a method performed by a BS in a wireless communication system is provided. The method includes receiving information about UE capability for simultaneous transmission of one or more UL signals scheduled to overlap in time domain from a UE, transmitting resource allocation information and priority information for a plurality of UL signals to the UE, and receiving the plurality of UL signals from the UE at the same time based on the priority information and the UE capability when a plurality of resources for the plurality of UL signals are identified as overlapping in the time domain based on the resource allocation information.

In accordance with another aspect of the disclosure, a UE in a wireless communication system is provided. The UE includes a transceiver, and at least one processor configured to report UE capability for simultaneous transmission of one or more UL signals scheduled to overlap in time domain to a BS through the transceiver, receive resource allocation information and priority information for a plurality of UL signals from the BS through the transceiver, identify based on the resource allocation information whether a plurality of resources for the plurality of UL signals overlap in the time domain, and transmit the plurality of UL signals to the BS through the transceiver at the same time based on the priority information and the UE capability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
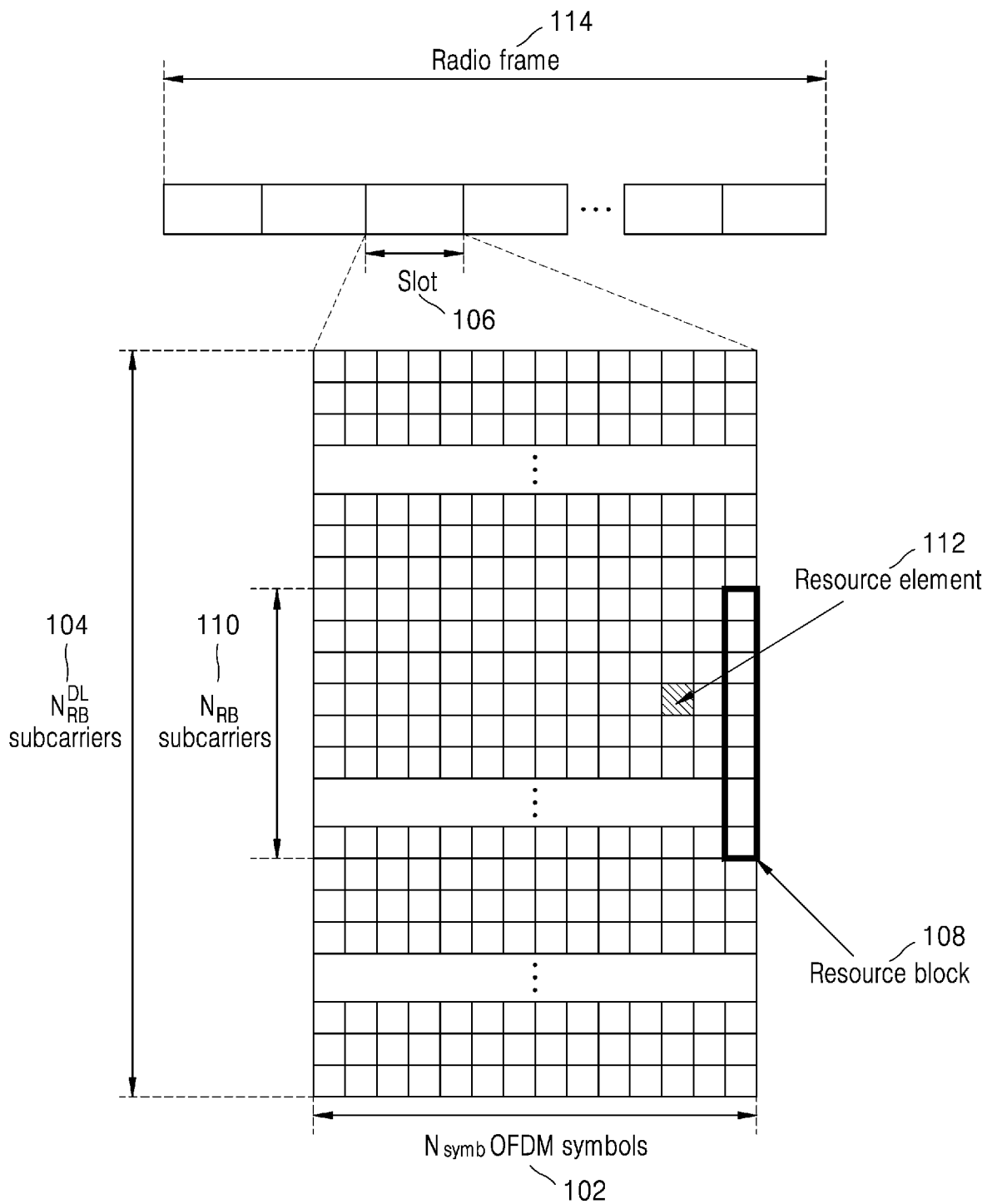
FIG. 1 illustrates a transmission structure of time-frequency domain, which is radio resource domain of a 5th generation (5G) or new radio (NR) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those skilled in the art. Like numbers refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a higher number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and Institute of Electrical and Electronics Engineers (IEEE) 802.16e communication standards. Furthermore, for the fifth generation (5G) wireless communication system, communication standards for 5G or new radio (NR) are being made.

As a representative example of a wide band wireless communication system, the 5G system or NR system employs orthogonal frequency division multiplexing schemes for downlink (DL) and uplink (UL). Specifically, a cyclic prefix orthogonal frequency-division multiplexing (CP-OFDM) scheme is employed for DL, and together with the CP-OFDM, discrete Fourier transform spreading OFDM (DFT-S-OFDM) scheme is employed for UL. The UL refers to a radio link for a terminal (or user equipment (UE) or mobile station (MS)) to transmit data or a control signal to a base station (BS, or gNode B or eNode B), and the DL refers to a radio link for a BS to transmit data or a control signal to a terminal. Such a multiple access scheme allocates and operates time-frequency resources for carrying data or control information for respective users not to overlap each other, i.e., to maintain orthogonality, thereby differentiating each user's data or control information.

The 5G system or NR system adopts a Hybrid Automatic Repeat request (HARQ) scheme that re-transmits corresponding data through a physical layer in a case that decoding fails at the initial stage of transmission. The HARQ scheme refers to a scheme in which, if a receiver fails to correctly decode data, the receiver transmits information indicating the decoding failure (Negative Acknowledgment (NACK)) to a transmitter so that the transmitter may re-transmit the corresponding data through the physical layer. The receiver may increase data reception capability by combining the data retransmitted by the transmitter with the data for which decoding has failed. Furthermore, in a case that the receiver correctly decodes data, the receiver may transmit information indicating decoding success (Acknowledgment (ACK)) to the transmitter so that the transmitter may transmit new data.

In the meantime, an NR system for new 5G communication is designed to freely multiplex various services in time and frequency resources. Accordingly, a waveform/numerology, a reference signal, etc., may be dynamically or freely allocated as required for the corresponding service. For wireless communication to provide a best service to a terminal, it is important to optimize data transmission through measurement of quality and interference of a channel, and accordingly, channel state measurement is required.

However, unlike the $4^{th}$ generation (4G) communication where channel and interference properties are not significantly changed depending on frequency resources, a 5G or NR channel has channel and interference properties that significantly change depending on services and is thus required to support a frequency resource group (FRG)-wise subset, which enables division of the measurement. In the meantime, service types supported in the 5G system or NR system may be divided into categories, such as Enhanced Mobile BroadBand (eMBB), massive Machine Type Communications (mMTC), Ultra-Reliable and Low-Latency Communications (URLLC), etc. The eMBB is a service for high rate transmission of high volume data, the mMTC is a service for least power consumption at the terminal and accesses of multiple terminals, and the URLLC is a service for high reliability and low latency. Depending on the type of service applied to the terminal, different requirements may be applied.

Of the aforementioned services, the URLLC service has a goal of high reliability and low latency, so control information and data information to be transmitted on a physical channel may be required to be transmitted at low coding rates. As for the control information, repetitive transmission functions for control information have already been introduced in machine type communications (MTC) or narrow band Internet of things (NB-IoT) services of LTE. A purpose of introducing this is to provide high coverage for terminals having narrow bandwidth, but in this case, latency has not been sufficiently taken into account. Furthermore, a minimum unit of repetitive transmission of control information is fixed to a subframe unit on an LTE basis. To support the URLLC service in an NR system or 5G system, there is a need for a repetitive transmission mode for control information that may require low latency and improve reliability. Hence, the disclosure basically considers an occasion where control information is repeatedly transmitted in a slot. In addition, an occasion where control information is repeatedly transmitted beyond the boundary of a slot may also be considered. A UE may detect control information transmitted from a BS, earlier with high reliability according to an operation provided in the disclosure.

Terms used in the disclosure are defined by taking the respective functionalities into account, but may vary depending on certain practices or intentions of users or operators. Accordingly, the terms should be defined based on descriptions throughout this specification.

In the following description, a base station is an entity for performing resource allocation for a UE, and may be at least one of a gNB, an eNB, a Node B, a BS, a radio access unit, a base station controller (BSC), or a network node. A terminal may include user equipment (UE), a mobile station (MS), a cellular phone, a smart phone, a computer, or a multimedia system capable of performing communication functions. Herein, downlink (DL) refers to a radio transmission path for a signal transmitted from a BS to a UE, and uplink (UL) refers to a radio transmission path for a signal transmitted from a terminal to a BS.

Furthermore, although an NR system will be described as an example in the disclosure, it is not limited thereto and embodiments of the disclosure may also be applied to other various communication systems having a similar technical background or channel type. Furthermore, embodiments of the disclosure will also be applied to different communication systems with some modifications to such an extent that does not significantly deviate the scope of the disclosure when judged by skilled people in the art.

In the disclosure, the terms 'physical channel' and 'signal' may be interchangeably used with data or a control signal. For example, a physical downlink shared channel (PDSCH) is a physical channel on which to transmit data, but in the disclosure, the PDSCH may also be called data.

In the disclosure, higher layer signaling is a method of transferring a signal to the UE from the BS on a DL data channel of the physical layer or to the BS from the UE on a UL data channel of the physical layer, and may also be referred to as radio access control (RRC) signaling or a medium access control (MAC) control element (CE).

In the meantime, as a study on next generation communication systems is being conducted these days, various schemes for scheduling communication with a UE are being discussed. Hence, an efficient scheduling and data transmission/reception scheme in consideration of characteristics of the next generation communication system is required. To provide a plurality of services for a user in the communication system, a method of providing the respective services to fit their characteristics in a same time interval and a corresponding apparatus are required.

The NR system adopts a hybrid automatic repeat request (HARQ) scheme that retransmits corresponding data from the physical layer in case decoding fails in initial transmission. By the HARQ scheme, when a receiver fails to correctly decode data, the receiver transmits information indicating the decoding failure (Negative Acknowledgment (NACK)) to a transmitter so that the transmitter may re-transmit the corresponding data from the physical layer. The receiver increases data reception capability by combining the data re-transmitted by the transmitter with the data for which decoding has failed. Further, in a case that the receiver correctly decodes data, the receiver may transmit information indicating decoding success (acknowledgment (ACK)) to the transmitter so that the transmitter may transmit new data.

A method and apparatus for transmitting HARQ-ACK feedback in response to DL data transmission will now be described. Specifically, a method of configuring HARQ-ACK feedback bits when a UE intends to transmit multiple HARQ-ACK within one slot in a UL direction will be described.

In a wireless communication system, especially an NR system, a BS may configure one or more component carriers (hereinafter, CCs) for DL transmission to the UE. For each CC, DL transmission and UL transmission slots and symbols may be configured.

In the meantime, when DL data, a physical downlink shared channel (PDSCH) is scheduled, at least one of PDSCH mapping slot timing information or information about a position of a starting symbol to which the PDSCH is mapped in the slot and the number of symbols to which the PDSCH is mapped in the slot may be delivered in a particular bit field of downlink control information (DCI). For example, when DCI is sent in slot n to schedule a PDSCH, in which case the slot timing information K0 for sending the PDSCH indicates 0, a start symbol position is 0, and the symbol length is 7, the PDSCH is transmitted by being mapped to seven symbols starting from symbol 0 in slot n.

After K1 slots after the DL data signal PDSCH is transmitted, HARQ-ACK feedback is transmitted from the UE to the BS. K1 information, timing information for HARQ-ACK transmission may be sent in DCI. An available candidate set of K1 value may be sent in higher layer signaling, and one of the candidates may be determined through the DCI.

When configured with a semi-static HARQ-ACK codebook, the UE may determine a table including at least one of information about a slot to which the PDSCH is mapped (slot information K0), start symbol information, or information about the number and length of symbols, and feedback bits (or an HARQ-ACK codebook size) to be transmitted by K1 candidate values which are HARQ-ACK feedback timing information for the PDSCH. The table including the information about a slot to which the PDSCH is mapped, the start symbol information, or the information about the number or length of symbols may have default values. Alternatively, there may be a table that may be configured by the BS for the UE.

When the UE is configured with a dynamic HARQ-ACK codebook, the UE may determine HARQ-ACK feedback bits (or an HARQ-ACK codebook size) to be transmitted by the UE according to DL assignment indicator (DAI) information included in the DCI in a slot in which the HARQ-ACK information is transmitted, based on the information K0 about the slot to which the PDSCH is mapped and HARQ-ACK feedback timing information K1 for the PDSCH.

A method and apparatus for configuring an HARQ-ACK codebook in a situation where the UE performs one or more HARQ-ACK transmissions in a slot is disclosed according to embodiments of the disclosure. Furthermore, a method and apparatus for transmitting HARQ-ACK feedback in response to DL data transmission in a carrier aggregation (CA) environment in the disclosure will now be described.

The 3GPP LTE Rel-10 adopts a bandwidth extension technology to support more amount of data transmission than the LTE Rel-8. The technology called bandwidth extension or carrier aggregation (CA) may extend the band to increase the amount of data transmission as much as the extended band as compared to the LTE Rel-8 UE. Each band is called a component carrier (CC), and the LTE Rel-8 UE is defined to have one DL CC and one UL CC. The UL CC connected to system information block 2 (SIB-2) and the DL CC are collectively called a cell. A connection relationship between the DL CC and the SIB-2 of the UL CC may be transmitted in a system signal or a higher layer signal. A UE supporting CA may transmit UL data and receive DL data through a plurality of serving cells.

In Rel-10, a carrier indicator field (CIF) may be configured as a field to indicate that, in a situation where the BS has difficulty in sending a physical downlink control channel (PDCCH) to a particular UE in a particular serving cell, the BS transmits the PDCCH in another serving cell and that the PDCCH indicates a physical downlink shared channel (PDSCH) (or a DL data channel) of the other serving cell or a physical uplink shared channel (PUSCH or a UL data channel). The CIF may be configured for a UE that supports CA. The CIF may be determined to indicate the other serving cell by adding three bits to PDCCH information in the particular serving cell. The BS may add the CIF to the PDCCH when cross carrier scheduling is performed and may not add the CIF to the PDCCH when the cross carrier scheduling is not performed. When the CIF is included in DL assignment (or allocation) information, the CIF may indicate a serving cell in which the PDSCH scheduled by DL allocation is to be transmitted, and when the CIF is included in UL resource allocation information (e.g., UL grant), the CIF may be defined to indicate a serving cell in which a PUSCH scheduled by the UL grant is to be transmitted.

As described above, LTE-10 defines the band extension technology, CA, so that the UE may be configured with a plurality of serving cells. The UE may transmit channel information for the plurality of serving cells to the BS periodically or aperiodically for data scheduling of the BS. The BS may schedule and transmit data for each carrier, and the UE may transmit, to the BS, acknowledgment/negative acknowledgment (A/N) feedback for the data transmitted for each carrier. LTE Rel-10 designs for the UE to transmit a maximum of 21 bits of A/N feedback to the BS, in which case when transmission of the A/N feedback overlaps transmission of channel information in a subframe, the A/N feedback is transmitted while the channel information is discarded. LTE Rel-11 designs for the UE to multiplex channel information of one cell with A/N feedback and transmit a maximum of 22 bits of A/N feedback and the channel information of the one cell in PUCCH format 3 in a transmission resource of the PUCCH format 3.

In LTE-13, assuming a scenario of configuring a maximum of 32 serving cells, a concept of extending the number of serving cells up to 32 by using not only licensed band but also unlicensed band is discussed. In this case, channel information transmissions for a plurality of serving cells may be likely to collide with each other in one subframe, and a new PUCCH format is designed to allow information about the plurality of channels or A/N feedback to be transmitted at the same time. Hence, there may be a need for a method of supporting a UE operation for multiplexing channel information about as many serving cells as possible and A/N feedback in one subframe under various conditions.

Specifically, in a situation where conditions such as the number of serving cells configured for the UE, a PUCCH format type configured for the UE, whether to simultaneously transmit PUCCH and PUSCH configured for the UE, or PUCCH transmissions in another secondary cell in addition to a primary cell configured for the UE are taken into account, there is a need for a method of determining channel information to be transmitted by the UE or transmission operation and transmission resources of the A/N feedback to be transmitted and transmitting the channel information and the A/N feedback separately or in combination based on a transmission format mapped to the transmission resource.

CA in 5G NR is equal to CA applied to LTE for most of operating functions but differs from the latter from the perspective of PUCCH transmission. For example, a PUCCH format is determined in LTE based on whether uplink control information (UCI) to be transmitted on a PUCCH is a scheduling request (SR), HARQ-ACK or channel state information (CSI), or information combined with at least one of the SR, HARQ-ACK or CSI, but in NR based on the number of UCI bits regardless of the SR, HARQ-ACK or CSI. Specifically, a PUCCH format may be determined according to time resource length (the number of symbols) and the number of UCI bits for the PUCCH.

When CCs supported for CA are possible to be in the same frequency band or in different frequency bands, there may be three possible CA scenarios as follows:
 1. Intraband aggregation with frequency-contiguous CCs
 2. Intraband aggregation with non-contiguous CCs
 3. Interband aggregation with non-contiguous CCs According to the scenarios, structures are all the same but radio frequency (RF) complexity may have a different degree depending on each of the scenarios. Unlike LTE, NR supports up to 16 carriers, and different frequency bandwidth and duplex modes. A maximum size of one carrier is about 400 MHz in NR, and when all the 16 carriers each have about 400 MHz, a maximum of 6.4 GHz bandwidth may be supported by CA in theory. The UE that supports CA equally as LTE may support simultaneous reception or transmission for two or more carriers. In the third of the above scenarios, there may be a different TDD configuration for each carrier. As the frequency bands are different, the different carriers may not need to have the same transmission direction. Hence, unlike the UE that does not support CA, the UE that supports CA may require a duplex filter to deal with the aforementioned situation.

In the 3GPP standard, CA may be described with the term 'cell'. The UE supporting CA may thus exchange information with multiple cells. One of the cells corresponds to a primary cell (PCell) that the UE discovers first and connects to. After this, secondary cells (Scells) may be configured through a higher layer signal and activated or deactivated through a MAC CE or RRC. For example, a bitmap of the MAC CE may indicate activation or deactivation of the secondary cells configured through the higher layer signal. The number of DL cells and the number of UL cells may be the same or different, but alternatively, the number of DL cells may be commonly larger than the number of UL cells.

In embodiments of the disclosure, a method and apparatus for transmitting, by a UE, a PUCCH in a slot in a CA occasion.

FIG. 1 illustrates a transmission structure of time-frequency domain, which is radio resource domain of a 5G or new radio (NR) system, according to an embodiment of the disclosure.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

The 5G system or NR system may be operated in wider channel bandwidth than the channel bandwidth for LTE presented in Table 1. Table 2 represents correspondence between system transmission bandwidth, channel bandwidth, and subcarrier spacing (SCS) in the 5G system or NR system.

TABLE 2

| | SCS [kHz] | Channel bandwidth $BW_{Channel}$ [MHz] | | | | | | | | |
|---|---|---|---|---|---|---|---|---|---|---|
| | | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

Referring to FIG. 1, in the radio resource domain, the horizontal axis represents the time domain, and the vertical axis represents the frequency domain. A minimum transmission unit in the time domain is an OFDM symbol, and $N_{symb}$ OFDM symbols 102 together define a slot 106. A subframe may be defined to be 1.0 ms long, and a radio frame 114 may be defined to be 10 ms long. A minimum transmission unit in the frequency domain is a subcarrier, and bandwidth of the whole system transmission band may be comprised of a total of $N_{BW}$ subcarriers 104. These specific numerical values may be, however, variously applied depending on the system.

A basic unit in the time-frequency resource domain is a resource element 112 (RE), which may be represented by an OFDM symbol index and a subcarrier index. A resource block (RB) 108 or a physical resource block (PRB) may be defined with $N_{symb}$ successive OFDM symbols 102 in the time domain and NRB successive subcarriers 110 in the frequency domain. Accordingly, one RB 108 may be comprised of $N_{symb} \times N_{RB}$ REs 112.

Generally, a minimum data transmission unit is an RB. In the 5G system or NR system, it is common that $N_{symb}=14$ and $N_{RB}=12$, and $N_{BW}$ and $N_{RB}$ may be proportional to the bandwidth of a system transmission band. Data rate increases in proportion to the number of RBs scheduled for the UE. In the 5G system or NR system, for a frequency division duplex (FDD) system differentiating and operating DL and UL by frequency, DL transmission bandwidth may differ from UL transmission bandwidth. Channel bandwidth refers to RF bandwidth corresponding to the system transmission bandwidth. Table 1 represents correspondence between system transmission bandwidth and channel bandwidth defined in an LTE system for 4G wireless communication before the 5G system or NR system. For example, the LTE system having 10 MHz channel bandwidth has transmission bandwidth of 50 RBs.

In the 5G system or NR system, scheduling information on DL data or UL data is transferred through downlink control information (DCI) from the BS to the UE. The DCI may be defined in various formats, and depending on each format, the DCI may indicate whether it is scheduling information (UL grant) for UL data or scheduling information (DL grant) for DL data, whether it is compact DCI with small-sized control information, whether spatial multiplexing is applied using multiple antennas, whether it is DCI for power control, etc. For example, DCI format 1-1 that is scheduling control information for DL data (DL grant) may include one piece of the following control information:

carrier indicator: indicates which frequency carrier is used for transmission.

DCI format indicator: an indicator for distinguishing whether the DCI is for DL or UL.

bandwidth part (BWP) indicator: an indicator to indicate on which BWP transmission is performed.

frequency domain resource allocation: indicates an RB in the frequency domain allocated for data transmission. A resource represented by system bandwidth and a resource allocation scheme is determined.

time domain resource allocation: indicates which slot and which OFDM symbol in the slot are used to transmit a data-related channel.

VRB-to-PRB mapping: indicates which scheme is used to map a virtual RB (VRB) index and a physical RB (PRB) index.

modulation and coding scheme (MCS): indicates a modulation scheme and a coding rate used for data transmission. Specifically, it may indicate a coding rate value that may give information about a transport block size (TBS) and channel coding along with information about whether it is quadrature phase shift keying (QPSK), 16 quadrature amplitude modulation (16 QAM), 64 QAM, or 256 QAM.

code block group (CBG) transmission information: indicates information about which CBG is transmitted when CBG retransmission is configured.

HARQ process number: indicates a process number of an HARQ.

new data indicator: indicates whether it is HARQ initial transmission or retransmission.

redundancy version: indicates a redundancy version of an HARQ.

transmit power control (TPC) command for physical uplink control channel (PUCCH): indicates a transmit power control command for UL control channel PUCCH.

For the PUSCH transmission, time domain resource allocation may be delivered by information about a slot in which a PUSCH is transmitted, a start symbol position S in the slot, and the number L of OFDM symbols to which the PUSCH is mapped. The S may be a relative position from the beginning of the slot, the L may be the number of successive OFDM symbols, and the S and L may be determined from a start and length indicator value (SLIV) defined in the following Equation 1:

$$\text{If } (L-1) \leq 7 \text{ then } SLIV = 14 \cdot (L-1) + S \text{ else } SLIV =$$
$$14 \cdot (14 - L + 1) + (14 - 1 - S) \text{ where } 0 < L \leq 14 - S$$

Equation 1

The 5G system or NR system may be configured with a table including an SLIV value, a PUSCH mapping type, and information about a slot in which the PUSCH is transmitted in a row commonly through RRC configuration. Subsequently, time domain resource allocation in DCI indicates an index value in the configured table, so that the BS may deliver an SLIV value, a PUSCH mapping type, and information about a slot in which the PUSCH is transmitted to the UE.

In the 5G system or NR system, type A and type B are defined for the PUSCH mapping type. For the PUSCH mapping type A, a first OFDM symbol of demodulation reference signal (DMRS) OFDM symbols is located in the second or third OFDM symbol in a slot. For the PUSCH mapping type B, a first OFDM symbol of DMRS OFDM symbols is located in the first OFDM symbol in a time domain resource allocated in PUSCH transmission. The aforementioned PUSCH time domain resource allocation method may be equally applied to PDSCH time domain resource allocation.

DCI may be transmitted on a physical downlink control channel (PDCCH) (hereinafter, interchangeably used with DL control channel or control information) after going through channel coding and modulation processes.

In general, DCI is scrambled by a specific radio network temporary identifier (RNTI) (or, UE identifier) separately for each UE, having cyclic redundancy check (CRC) added thereto, channel-coded, and then configured and transmitted in a separate PDCCH. The PDCCH is mapped and transmitted in a control resource set (CORESET) configured for the UE.

DL data may be transmitted on a physical downlink shared channel (PDSCH), which is a physical channel for DL data transmission. The PDSCH may be transmitted after a control channel transmission interval, and scheduling information such as a specific mapping position in the frequency domain, modulation scheme, etc., is determined based on the DCI transmitted through the PDCCH.

Through an MCS of the control information that makes up the DCI, the BS notifies the UE of a modulation scheme applied to the PDSCH for transmission and the size of data to be transmitted (transport block size; TBS). In an embodiment of the disclosure, an MCS may be comprised of 5 bits or more than or less than 5 bits. The TBS corresponds to the size of data (transport block; TB) to be transmitted by the BS before channel coding for error correction is applied to the data.

In the disclosure, the transport block (TB) may include a medium access control (MAC) header, a MAC control element (CE), one or more MAC service data units (MAC SDUs), and padding bits. Alternatively, the TB may represent a data unit or a MAC protocol data unit (MAC PDU) passed down to the physical layer from the MAC layer.

The 5G system or NR system supports the following modulation schemes: QPSK (Quadrature Phase Shift Keying), 16 QAM (Quadrature Amplitude Modulation), 64 QAM, and 256 QAM, and their respective modulation orders Qm are 2, 4, 6, and 8. For example, two bits per symbol may be transmitted for QPSK modulation, 4 bits per OFDM symbol for 16 QAM modulation, 6 bits per symbol for 64 QAM modulation, and 8 bits per symbol for 256 QAM modulation.

In the 5G system or NR system, when the UE is scheduled by DCI for PDSCH or PUSCH and a time resource allocation field included in the DCI indicates index m, this indicates a combination of data resource allocation length L, data resource start symbol S, slot index $K_0$, PDSCH mapping type information, and DMRS type A position information corresponding to m+1 in the table representing time domain resource allocation information. For example, Table 3 includes time domain resource allocation information.

TABLE 3 normal cyclic prefix based PDSCH time domain resource allocation

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position in which a DMRS is transmitted in a slot indicated in a system information block (SIB), which is one piece of UE-common control information. An available value for the field is 2 or 3. When there is a total of 14 symbols in one slot and the first symbol index is 0, '2' may indicate a third symbol and '3' a fourth symbol.

In Table 3, the PDSCH mapping type is information indicating a position of the DMRS in the scheduled data resource region. When the PDSCH mapping type is A, the DMRS may be transmitted or received in the symbol position always determined in dmrs-typeA-Position regardless of the allocated data time domain resource.

When the PDSCH mapping type is B, the DMRS may be transmitted or received always in the first symbol of the allocated data time domain resource. In other words, the PDSCH mapping type B does not use the dmrs-typeA-Position information.

In Table 3, $K_0$ may indicate an offset between a slot index to which a PDCCH, on which the DCI is transmitted, belongs and a slot index to which a PDSCH or PUSCH scheduled in the DCI belongs. For example, when the slot index of the PDCCH is n, a slot index of the PDSCH or PUSCH scheduled by the DCI of the PDCCH is n+$K_0$.

In Table 3, the S indicates a start symbol index of a data time domain resource in a slot. An available range of values of the S may be 0 to 13 with respect to the normal cyclic prefix.

In Table 3, the L indicates a length of data time domain resource interval in a slot. An available range of values of the L is 1 to 14. The available values for S and L are, however, determined according to the Equation 1 and Table 5 or 6. Table 3 represents default values that the UE uses before receiving time resource allocation information by UE-specific or UE-common higher layer signaling. For example, DCI format 0_0 or 1_0 may always use Table 3 as default time resource domain values.

Table 3 has PDSCH time domain resource allocation values, and K1 values are used to replace K2 values for PUSCH time domain resource allocation. Table 4 below is an example of a PUSCH time domain resource allocation table.

TABLE 4 normal cyclic prefix based PUSCH time domain resource allocation

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Table 5 below illustrates available combinations of S and L according to whether the cyclic prefix is normal or extended and whether the PDSCH mapping type is A or B.

TABLE 5 combination of S and L available for PDSCH time domain resource allocation

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ... , 14} | {3, ... , 14} | {0, 1, 2, 3] (Note 1) | {3, ... , 12} | {3, ... , 12} |
| Type B | {0, ... , 12} | {2, 4, 7} | {2, ... , 14} | {0, ... , 10} | {2, 4, 6} | {2, ... , 12} |

Note 1:
S = 3 is applicable only if dmrs – TypeA – Position = 3

Table 6 below illustrates available combinations of S and L according to whether the cyclic prefix is normal or extended and whether the PUSCH mapping type is A or B.

TABLE 6 combination of S and L available for PUSCH time domain resource allocation

| PUSCH mapping type | Normal cyclic prefix | | | Extended cyclic prefix | | |
|---|---|---|---|---|---|---|
| | S | L | S + L | S | L | S + L |
| Type A | 0 | {4, ... , 14} | {4, ... , 14} | 0 | {4, ... , 12} | {4, ... , 12} |
| Type B | {0, ... , 13} | {1, ... , 14} | {1, ... , 14} | {0, ... , 12} | {1, ... , 12} | {1, ... , 12} |

Each index in Table 3 may be configured by a higher layer signaling parameter PDSCH-TimeDomain ResourceAllocationList or PUSCH-TimeDomainResourceAllocationList.

PDSCH-TimeDomainResourceAllocationList includes one or more higher layer signaling parameters PDSCH-TimeDomainResourceAllocations, and there are k0, mappingtype, and startSymbolAndLength in PDSCH-TimeDomainResourceAllocation. An available range of values of k0 is 0 to 32. Mappingtype may correspond to type A or type B. An available range of values of StartSymbolAndLength is 0 to 127. In a case that mappingtype is type A, a symbol position of the DMRS follows a value indicated by dmrs-typeA-Position.

PUSCH-TimeDomainResourceAllocationList includes one or more higher layer signaling parameters PUSCH-TimeDomainResourceAllocations, and there are k0, mappingtype, and startSymbolAndLength in PUSCH-TimeDomainResourceAllocation. An available range of values of k0 is 0 to 32. Mappingtype may correspond to type A or type B. An available range of values of StartSymbolAndLength is 0 to 127. In a case that mappingtype is type A, a symbol position of the DMRS follows a value indicated by dmrs-typeA-Position.

The PDSCH-TimeDomainResourceAllocation or PUSCH-TimeDomainResource Allocation may be a PDSCH or PUSCH time domain resource allocation method in one slot. Higher layer signaling aggregationFactorDL may refer to the number of slots in which a value of PDSCH-TimeDomainResourceAllocation applied in a slot is repeatedly transmitted. Higher layer signaling aggregationFactorUL may refer to the number of slots in which a value of PUSCH-TimeDomainResourceAllocation applied in a slot is repeatedly transmitted. An available range of values of aggregationFactorDL and aggregationFactorUL is {1, 2, 4, and 8}. When aggregationFactorDL is e.g., 8, it may mean that one of available values of PDSCH-TimeDomainResourceAllocation is repeatedly transmitted across a total of slots. However, when at least some of symbols applied to PDSCH-TimeDomainResourceAllocation in a particular slot are UL symbols, PDSCH transmission and reception in the slot may be skipped. Likewise, when at least some of symbols applied to PUSCH-TimeDomainResourceAllocation in a particular slot are DL symbols, PUSCH transmission and reception in the slot may be skipped.

Embodiments of the disclosure will now be described in conjunction with accompanying drawings. In the following description, a BS is an entity for performing resource allocation for a terminal and may be at least one of a gNB, an eNB, a Node B, a radio access unit, a base station controller, or a network node. The terminal may include a UE, a mobile station (MS), a cellular phone, a smart phone, a computer, or a multimedia system capable of performing a communication function. Although the following embodiments will focus on the 5G system as an example, they may be equally applied to other communication systems with similar technical backgrounds or channel types. For example, they may be applied to LTE or LTE-A mobile communication and future mobile communication technologies beyond 5G. Furthermore, embodiments of the disclosure will also be applied to other communication systems through some modifications to an extent that does not significantly deviate from the scope of the disclosure when judged by those of ordinary skill in the art. The disclosure may be applied to FDD and TDD systems.

In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

In the following description, higher layer signaling may correspond to one or more combinations of the following signaling:
 Master Information Block (MIB)
 System Information Block (SIB) or SIB X (X=1, 2, . . . )
 Radio Resource Control (RRC)
 Medium Access Control (MAC) Control Element (CE)
 Furthermore, L1 signaling may correspond to one or more combinations of the following signaling methods using a physical layer channel or signaling:
 Physical Downlink Control Channel (PDCCH)
 Downlink Control Information (DCI)
 UE-specific DCI
 Group-common DCI
 Common DCI
 Scheduling DCI (e.g., DCI used for the purpose of scheduling DL or UL data)
 Non-scheduling DCI (e.g., DCI not used for the purpose of scheduling DL or UL data)
 PUCCH
 Uplink Control Information (UCI)

Determining priorities among A and B may refer to selecting one of A and B that has a higher priority according to a preset priority rule and performing a corresponding operation or omitting or dropping an operation for the other one that has a lower priority.

The above examples will now be described with several embodiments, in which case one or more embodiments may be applied simultaneously or in combination rather than separately.

Figure 2:
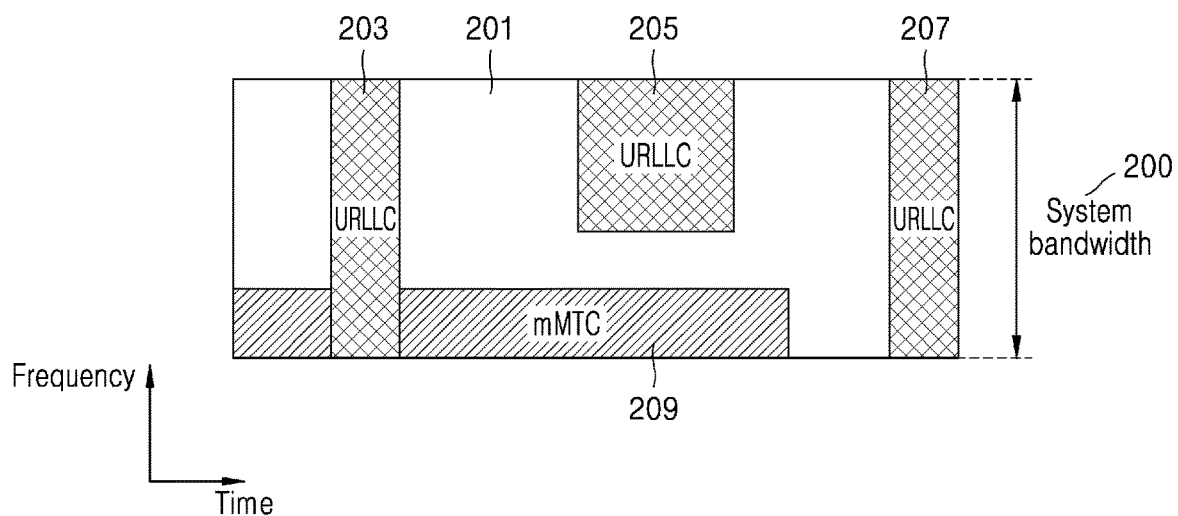
FIG. 2 is a view for describing how to allocate a plurality of items of data for enhanced mobile broadband (eMBB), ultra-reliable and low latency communications (URLLC), and massive machine type communications (mMTC) in time-frequency resource domain in a 5G or NR system, according to an embodiment of the disclosure.

FIG. 2 is a view for describing how to allocate a plurality of items of data for enhanced mobile broadband (eMBB), ultra-reliable and low latency communications (URLLC), and massive machine type communications (mMTC) in time-frequency resource domain in a 5G or NR system, according to an embodiment of the disclosure.

Referring to FIG. 2, data for eMBB, URLLC, and mMTC may be allocated in a whole system frequency band 200. When URLLC data 203 205, and 207 occurs and needs to be transmitted while eMBB 201 and mMTC 209 are allocated and being transmitted in a particular frequency band, the URLLC data 203, 205, and 207 may be transmitted without emptying or transmitting a part already allocated the eMBB 201 and the mMTC 209.

Of the aforementioned services, URLLC requires reduction in latency, so that the URLLC data may be allocated and transmitted in a portion of a resource allocated the eMBB or mMTC.

When URLLC is further allocated and transmitted in a resource allocated eMBB, the eMBB data may not be transmitted in the overlapping time-frequency resource, and accordingly, transmission performance for the eMBB data may be reduced. In other words, eMBB data transmission failure may occur due to the URLLC allocation.

Figure 3:
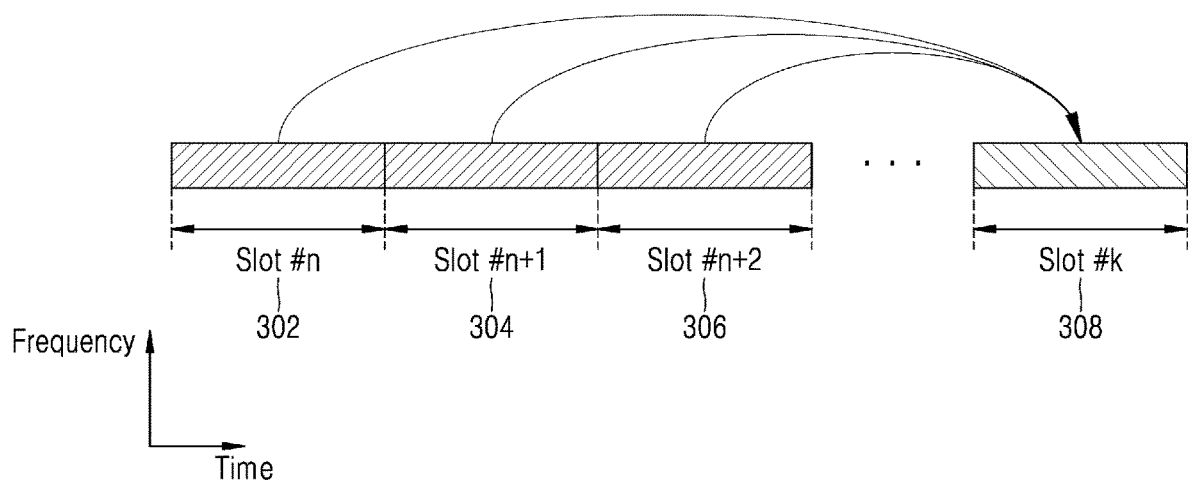
FIG. 3 illustrates how to configure a semi-static hybrid automatic repeat and request (HARQ) acknowledgment (ACK) codebook in an NR system, according to an embodiment of the disclosure.

FIG. 3 illustrates how to configure a semi-static HARQ-ACK codebook in an NR system, according to an embodiment of the disclosure.

In a situation where the number of HARQ-ACK PUCCHs that may be transmitted by the UE in one slot is limited to one, when the UE receives semi-static HARQ-ACK codebook higher layer configuration, the UE may report the BS of HARQ-ACK information relating to PDSCH reception or semi-persistent scheduling (SPS) PDSCH release in the HARQ_ACK codebook in a slot indicated by a value of a PDSCH-to-HARQ_feedback timing indicator in DCI format 1_0 or DCI format 1_1.

The UE may report the BS of an HARQ-ACK information bit value in the HARQ-ACK codebook in a slot not indicated by the PDSCH-to-HARQ_feedback timing indicator field in the DCI format 1_0 or DCI format 1_1.

When the UE reports only HARQ-ACK information relating to one SPS PDSCH release or one PDSCH reception in $M_{A,C}$ occasions for candidate PDSCH reception, and the reporting is scheduled by the DCI format 1_0 including information indicating that a counter DACI field is '1' in the Pcell, the UE may determine an HARQ-ACK codebook for the corresponding SPS PDSCH release or corresponding PDSCH reception.

Others may follow a method of determining an HARQ-ACK codebook according to what will be described below.

Assuming that a set of candidate PDSCH reception occasions in a serving cell c is $M_{A,C}$, $M_{A,C}$ may be obtained by the following [pseudo-code 1] operations:

[Start of Pseudo-Code 1]
- operation 1: initialize j to 0 and $M_{A,C}$ to a null set. initialize HARQ-ACK transmission timing index k to 0.
- operation 2: set R to a set of rows in the table including information about a slot to which the PDSCH is mapped, start symbol information, or information about the number or length of symbols. When a PDSCH available mapping symbol indicated by each value of R is set to a UL symbol according to DL and UL configuration configured on a higher layer, delete the corresponding row from R.
- operation 3-1: when the UE may receive one PDSCH for unicast in a slot and R is not the null set, add one to the set $M_{A,C}$.
- operation 3-2: when the UE may receive more than one PDSCH for unicast in a slot, count the number of PDSCHs allocable to different symbols in the computed R and add as many PDSCHs as the number counted to $M_{A,C}$.
- operation 4: increment k by 1 and get started again from operation 2

[End of Pseudo-Code 1]

Referring to FIG. 3 for the [pseudo-code 1], to perform HARQ-ACK PUCCH transmission in slot #k 308, candidate slots allowing PDSCH-to-HARQ-ACK timing that may indicate slot #k 308 may all be taken into account.

Referring to FIG. 3, it is assumed that PDSCHs scheduled in slot #n 302, slot #n+1 304 and slot #n+2 306 may be HARQ-ACK transmitted in slot #k 308 according to an available PDSCH-to-HARQ-ACK timing combination. The maximum number of schedulable PDSCHs for each slot may be obtained by taking into account time domain resource configuration information of schedulable PDSCHs in slots #n, #n+1 and #n+2 302, 304 and 306 and information indicating whether the symbol in the slot is DL or UL.

For example, when up to two PDSCHs, three PDSCHs and two PDSCHs may be scheduled in slot #n 302, slot #n+1 304 and slot #n+2 306, respectively, the maximum number of PDSCHs included in the HARQ-ACK codebook transmitted in slot #k 308 is 7 in all. This is called cardinality of the HARQ-ACK codebook.

Figure 4:
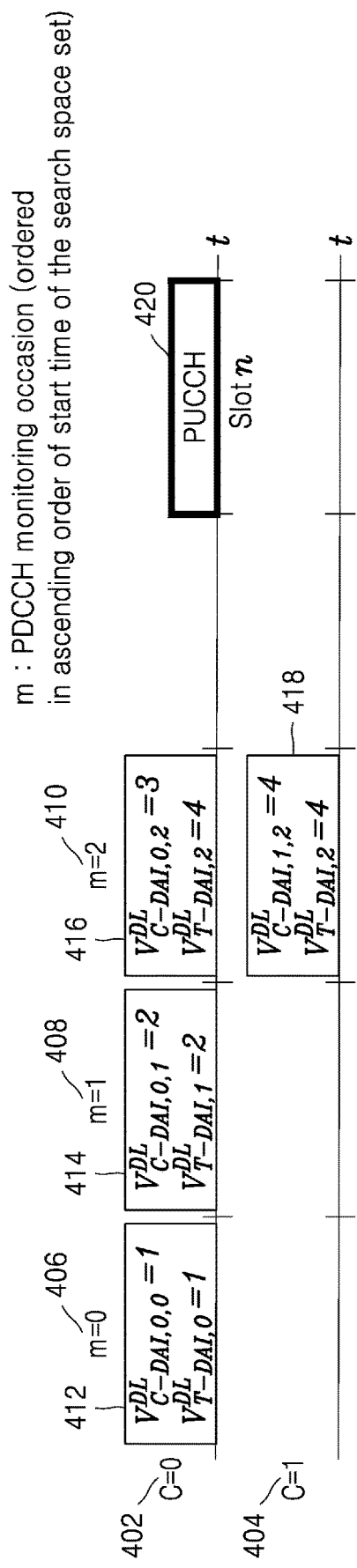
FIG. 4 illustrates how to configure a dynamic HARQ-ACK codebook in an NR system, according to an embodiment of the disclosure.

FIG. 4 illustrates how to configure a dynamic HARQ-ACK codebook in an NR system according to an embodiment of the disclosure.

Based on transmission slot position information K0 of a PDSCH scheduled in the DCI format 1_0 or 1_1 and a value of PDSCH-to-HARQ feedback timing for PUCCH transmission of HARQ-ACK information in slot n for PDSCH reception or SPS PDSCH release, the UE transmits HARQ-ACK information transmitted on a PUCCH in the slot n. Specifically, for the aforementioned HARQ-ACK information transmission, the UE may determine an HARQ-ACK codebook of a PUCCH transmitted in a slot determined by PDSCH-to-HARQ feedback timing and K0 based on a downlink assignment index (DAI) included in DCI that indicates PDSCH or SPS PDSCH release.

The DAI includes a counter DAI and total DAI The counter DAI is information indicated by HARQ-ACK information corresponding to a PDSCH scheduled in the DCI format 1_0 or DCI format 1_1 about a position in the HARQ-ACK codebook. Specifically, a value of the counter DAI in the DCI format 1_0 or 1_1 indicates an accumulated value of PDSCH reception or SPS PDSCH release scheduled by the DCI format 1_0 or DCI format 1_1 in a particular cell c. The accumulated value is set based on a serving cell and a PDCCH monitoring occasion where there is DCI scheduled.

The total DAI is a value indicating a size of the HARQ-ACK codebook. Specifically, the value of the total DAI refers to a total number of PDSCH or SPS PDSCH releases scheduled before, including a time at which the DCI is scheduled. The total DAI may be a parameter used when HARQ-ACK information in the serving cell c in CA situation even includes HARQ-ACK information about a PDSCH scheduled in another cell including the serving cell c. In other words, the total DAI parameter may not be present in a system operating in one cell. It is, of course, not limited thereto.

An operation for the DAI is illustrated in FIG. 4. FIG. 4 is a diagram illustrating a change in values of the counter DAI (C-DAI) and total DAI (T-DAI) indicated by DCI discovered for each PDCCH monitoring occasion configured for each carrier, when the UE is configured with two carriers: carrier 0 401 and carrier 1 404, and an HARQ-ACK codebook selected based on the DAI is transmitted on a PUCCH 420 in an n-th slot.

First, DCI discovered at m=0 406 indicates that the C-DAI and the T-DAI each have a value of 1 (412). DCI discovered at m=1 408 indicates that the C-DAI and the T-DAI each have a value of 2 (414). DCI discovered at carrier 0 (c=0) 402 of m=2 410 indicates that the C-DAI has a value of 3 (416). DCI discovered at carrier 1 (c=1) 404 of m=2 410 indicates that the C-DAI has a value of 4 (418). In this case, when the carriers 0 and 1 are scheduled in the same monitoring occasion, the T-DAI for both of them is indicated to have 4.

Referring to FIGS. 3 and 4, determining the HARQ-ACK codebook is made in a condition that one PUCCH having HARQ-ACK information is transmitted in one slot. This is called mode 1. As an example of a method of determining a PUCCH transmission resource in one slot, when PDSCHs scheduled in different pieces of DCI are multiplexed and transmitted in one HARQ-ACK codebook in the same slot, a PUCCH resource selected for HARQ-ACK transmission may be determined to be a PUCCH resource indicated by a PUCCH resource field indicated in DCI that schedules the last PDSCH. That is, a PUCCH resource indicated by a PUCCH resource field indicated in the other DCI scheduled before the DCI may be discarded.

In the following description, a method and apparatus for determining an HARQ-ACK codebook in a condition where two or more PUCCHs including HARQ-ACK information may be transmitted in one slot is defined. This is called mode 2. The UE may be operated only in mode 1 (transmitting one HARQ-ACK PUCCH in one slot) or mode 2 (transmitting one or more HARQ-ACK PUCCHs in one slot). Alternatively, the UE that supports both mode 1 and mode 2 may be configured by a BS through higher layer signaling to be operated in only one mode, or mode 1 and mode 2 may be implicitly determined for the UE by a DCI format, an RNTI, a specific DCI field value, scrambling, etc. For example, a PDSCH scheduled in DCI format A and associated HARQ-ACK information are based on mode 1, and a PDSCH scheduled in DCI format B and associated HARQ-ACK information are based on mode 2. What are described in connection with FIGS. 3 and 4 may refer to the 3GPP TS38.213, section 9.2.

Figure 5:
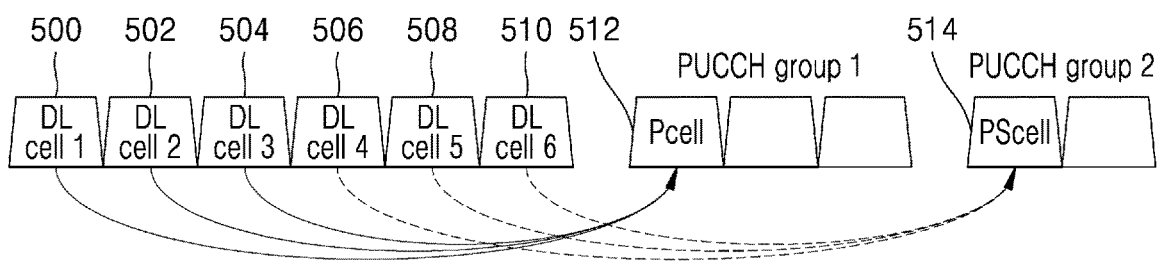
FIG. 5 is a view for describing a concept of a physical uplink control channel (PUCCH) cell associated with a downlink cell in a carrier aggregation situation, according to an embodiment of the disclosure.

FIG. 5 is a view for describing a concept of a PUCCH cell associated with a DL cell in a CA situation, according to an embodiment of the disclosure.

HARQ-ACK information may be basically used for the purpose of the UE informing the BS of a result of demodulating/decoding a scheduled PDSCH. Basically in an NR system, all feedback including the HARQ-ACK information (i.e., UCI) may be transmitted in a primary cell (Pcell). It is a situation determined by taking into account the fact that the number of DL cells and the number of UL cells may not be always the same as described above. Hence, HARQ-ACK information for many DL CCs may be transmitted or received on one UL carrier. HARQ-ACK or other UCI information has an increasing number of bits of the UCI when the number of DL CCs increases, which may be a burden to transmission on a single UL carrier.

To compensate the defect, two PUCCH groups may be configured in NR: a first group may transmit a PUCCH including UCI information in the Pcell and a second group may transmit a PUCCH including UCI information in PScell. This is illustrated in FIG. 5. In PUCCH group 1, Pcell 512 is a cell in which PUCCH transmission or reception for DL cells 500, 502 and 504 is performed. In PUCCH group 2, PScell 514 is a cell in which PUCCH transmission or reception for DL cells 506, 508 and 510 is performed. A detailed method of generating a PUCCH group refers to descriptions in the 3GPP TS38.331, section 6.3.2, and a method of transmitting or receiving PUCCH information based on the PUCCH group refers to descriptions in the 3GPP TS38.213, section 9.

In the following embodiments of the disclosure, problems that may arise between carriers present in one or the same PUCCH group will be addressed. URLLC is a service requiring high reliability and low latency as described above, and minimizing unnecessary delay time between the BS and the UE is an important factor. In a situation where TDD configuration information of each CA cell is different, the BS allocates a resource in which to transmit a PUCCH for DL CCs associated with the same PUCCH group by taking into account configuration information of a slot format indicator (SFI) of the Pcell.

In other words, no PUCCH may be transmitted for symbols indicated by a higher layer signal or L1 signal for the DL direction in Pcell. Hence, transmission delay of the PUCCH is likely to increase. In the subsequent embodiments of the disclosure, methods of minimizing the delay will be discussed.

Figure 6:
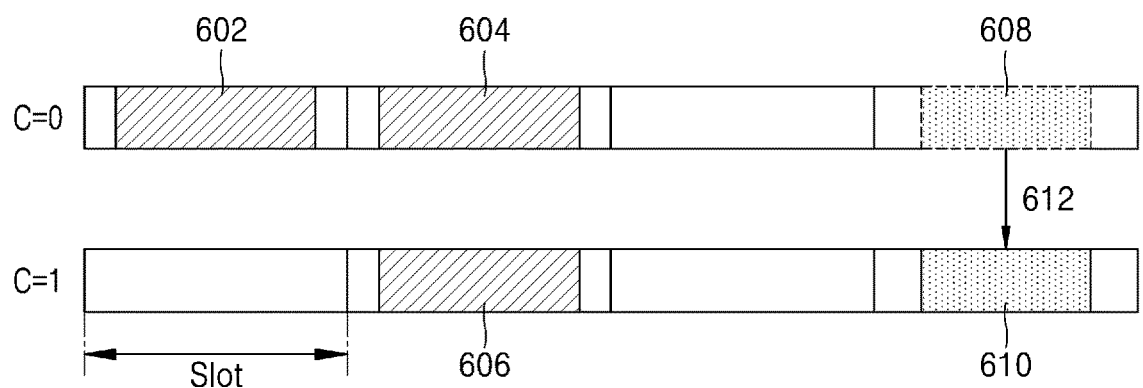
FIG. 6 illustrates a method of transmitting HARQ-ACK information in a situation where carriers involved in carrier aggregation have different time division duplex (TDD) structures, according to an embodiment of the disclosure.

FIG. 6 illustrates a method of transmitting HARQ-ACK information in a situation where carriers involved in CA have different TDD structures, according to an embodiment of the disclosure.

Referring to FIG. 6, a situation where two carriers are involved in CA for a UE is shown, Pcell is a cell having a cell index of 0 (c=0), and a cell index of 1 (c=1) indicates a secondary cell. As the two carriers are in both the TDD structure, the number of UL cells and the number of DL cells may be the same, which is two. Although the DL cell index and the UL cell index are considered the same in the example of FIG. 6, they may have different values. For example, a DL cell index of 3 may be associated with the UL primary cell. Furthermore, TDD structural information for the cell of c=0 and the cell of c=1 may be configured to have different directions by the SFI.

Referring to FIG. 6, the BS schedules two PDSCHs 602 and 604 in the cell of c=0 through DCI, and a resource in which to transmit a PUCCH 608 including HARQ-ACK information for the corresponding PDSCH is determined based on a PUCCH resource indicator field and PDSCH-to-HARQ-ACK timing information of the DCI. Furthermore, a PUCCH including HARQ-ACK information for a PDSCH 606 scheduled in c=1 may also be transmitted on the PUCCH 608 including the HARQ-ACK information for the PDSCHs 602 and 604. Accordingly, the HARQ-ACK information included in the PUCCH 608 may include results of demodulating/decoding PDSCHs 602 and 604 of c=0 and the PDSCH 606 of c=1, and the PUCCH including the HARQ-ACK information may be transmitted by the UE to the BS on the PUCCH 608 of the primary cell of c=0.

However, when a portion of the resource of the PUCCH 608 is indicated to be a DL symbol through a higher layer signal or L1 signal, the UE may not be able to transmit the PUCCH 608 and may consider this as an error case and thus perform an arbitrary operation. To avoid such an error case scenario, the BS needs to ensure all the symbols in which to transmit the PUCCH 608 to be UL symbols.

In the TDD structure, there is more DL traffic, so a percentage of DL symbols is higher than that of UL symbols. Hence, the BS may transmit the PUCCH 608 in the foremost UL symbol as long as the UE as described in the 3GPP TS 38.214, section 5.3 satisfies the minimum processing time required for transmission of HARQ-ACK information for the PDSCH. However, when some resources of the PUCCH 608 are indicated to be DL symbols as described above in connection with FIG. 6, the PCCH may subsequently be scheduled to be delayed to a slot that exists as UL symbols. For URLLC, however, the HARQ-ACK transmission delay may cause retransmission delay of the PDSCH as described above, thereby increasing delay time for overall data transmission and reception.

When the resource of the PUCCH 608 may be included not in the primary cell but in the secondary cell in the same slot, it is reasonable to transmit the PUCCH not to the primary cell but to the secondary cell to reduce the delay time. For example, the UE may transmit a PUCCH 610 of c=1 by regarding the PUCCH 608 of c=0 as the PUCCH 610 of c=1 in an explicit or implicit alteration method 612. In this case, the PUCCH 608 and the PUCCH 610 may include the same UCI information, and PUCCH resource information may be the same regardless of the cell index or may be explicitly or implicitly changed for the altered cell.

When the PUCCH resource information is the same, the UE may perform the same PUCCH transmission based on the lowest RB index with respect to an activated BWP regardless of the frequency bandwidth size for both c=0 and c=1.

When the PUCCH resource information is different, for example, the frequency band of c=0 is 100 MHz and the frequency band of c=1 is 10 MHz, frequency resource allocation information, frequency hopping information, PUCCH power allocation information, etc., may be changed. Before supporting the changed information, the BS may provide the UE with PUCCH related configuration information described in the 3GPP TS 38.331, section 6.3.2 for each cell and the UE may apply them for the altered cell by taking into account the higher layer information.

When the UE receives different PUCCH resource information by taking into account the higher layer configuration information, there may be no need for an extra DCI field or L1 signal. Alternatively, a combination of the two methods may be applied. For example, when the different PUCCH configuration information for each cell is not configured by the higher layer signal, the UE may consider that the PUCCH configuration information for each cell is the same and follow the aforementioned method. On the other hand, when the different PUCCH configuration information for each cell is configured by a higher layer signal, the UE performs PUCCH transmission by taking into account PUCCH higher layer signal configuration information relating to the cell based on the altered cell index.

Hence, although in the existing Rel-15, indicating a PUCCH resource in another DCI in a resource indicated in a DL symbol is regarded as an error case, the error case may no longer be the error case when the CA and respective carriers have different TDD configuration information as in FIG. 6. There may be the following two methods of supporting the explicit or implicit alteration method 612 for the UE to regard the PUCCH of a first cell corresponding to a first cell index as the PUCCH of a second cell corresponding to a second cell index:

Method 6-1: Implicit Method (Changing Cell Index for PUCCH Transmission in a Particular Manner)

The implicit method may be a method of transmitting PUCCH information in valid UL symbols base on slot format information configured for each cell in advance without an extra indication by extra L1 signaling. When a PUCCH resource indicated finally by DCI is basically valid in the primary cell, the UE may transmit the PUCCH resource in the primary cell.

On the other hand, when the PUCCH resource indicated finally by the DCI is not valid in the primary cell, the UE may transmit the PUCCH resource in the foremost secondary cell in the sequence determined by at least one of the following sub-methods among secondary cells valid for PUCCH resource transmission.

The expression 'valid' means that at least some of the symbols of the PUCCH resource indicated are not configured/indicated as DL symbols. The expression 'invalid (or not valid)' means that at least some of the symbols of the PUCCH resource indicated are configured/indicated as DL symbols. The cell index may be one from the perspective of logical or physical channel.

sub-method 6-1-1: when a primary cell index is c=i, a cell for PUCCH transmission among the secondary cells may be determined in the ascending order (c=0→1→2→ . . . ) or descending order (c=k→k-1→k-2→ . . . ) of cell indexes except for c=i. k may be the total number of cells available for PUCCH transmission, the total number of UL transmission cells, or a value set by BS configuration in a CA situation. When secondary cells 0, 5 and 6 are valid for PUCCH resource transmission according to the sub-method, the PUCCH may be transmitted or received in a secondary cell corresponding to c=0 in the ascending order or c=6 in the descending order.

sub-method 6-1-2: when a primary cell index is c=i, a cell for PUCCH transmission among the secondary cells may be determined in an ascending order or a descending order of secondary cell indexes except for c=i. A difference from the sub-method 6-1-1 lies in that the ascending order or descending order is determined based on the primary cell index. For example, in the case of the ascending order, it is determined in the following order: the primary cell (c=i)→c=mod(i+1, k)→c=mod(i+2, k)→c=mod(i+3, k)→ . . . . For example, in the case of the descending order, it is determined in the following order: the primary cell (c=i)→c=mod(i-1, k)→c=mod(i-2, k)→c=mod(i-3, k)→ . . . . When secondary cells 0, 5 and 6 are valid for PUCCH resource transmission according to the sub-method and i=4, the PUCCH may be transmitted or received in a secondary cell corresponding to c=5 in the ascending order or c=0 in the descending order.

In the method 6-1, the UE may implicitly select a cell for PUCCH transmission. When both the primary cell and the secondary cell in one PUCCH group are not valid for the PUCCH resource transmission, the UE may regard this as an error case and perform an arbitrary operation.

Method 6-2: Explicit Method (Selecting a Cell Index for PUCCH Transmission)

The explicit method is to explicitly indicate a cell index for transmission of a PUCCH including UCI information in a DCI field or by L1 signaling similarly to cross carrier scheduling where the cell for transmitting or receiving the PDCCH and the cell for transmitting or receiving the PDSCH/PUSCH are different. The following sub-methods may be considered, and at least one of them may be used.

sub-method 6-2-1: an additional DCI field such as a carrier indication field (CIF) may be added. In this case, when the bit field has n bits, the UE may indicate a total of $2^n$ cell indexes, in which case the BS indicates which UL cell index is associated for each value by a higher layer signal in advance. The first value may always be the primary cell.

sub-method 6-2-2: A value of the PUCCH resource indicator, which is a field of DCI indicating the PUCCH resource, may include information associated with a particular cell index in a higher layer signal in advance. When the higher layer signal has no configured value, the UE may determine it as PUCCH resource information associated with the primary cell. Specifically, for the PUCCH resource indicator information, a PUCCH format, time/frequency resource information, hopping information, etc., are included in higher layer signal configuration information (refer to the 3GPP TS 38.331, section 6.3.2), and additional cell index information for transmission of the PUCCH is also included in the higher layer signal configuration information.

sub-method 6-2-3: associated with a CORESET or search space index. Specifically, it may be possible to configure a cell index for transmission of PUCCH information for DCI detected in the higher layer signal configuration information relating to the CORESET or search space in advance. When the higher layer signal configuration information is not included in the higher layer signal related to the CORESET or search space in advance, the UE determines that the primary cell transmits the PUCCH information.

sub-method 6-2-4: RNTI or other RRC configuration information (sub-slot configuration, HARQ-ACK codebook index, or processing time) In a case of the RNTI, RNTI A, or primary cell and RNTI B, the UE may interpret that the PUCCH information is transmitted in one of secondary cells configured in advance by a higher layer signal. Furthermore, a cell index for transmission of the PUCCH information may be determined according to sub-slot configuration, which is an RRC parameter indicating PDSCH-to-HARQ-ACK feedback timing in a unit of a sub-slot smaller than 14 symbols instead of a slot. Similarly, a cell index for transmission of the PUCCH information may be determined according to an HARQ-ACK codebook index value or processing time capability determined in a higher layer signal or L1 signal.

Figure 7:
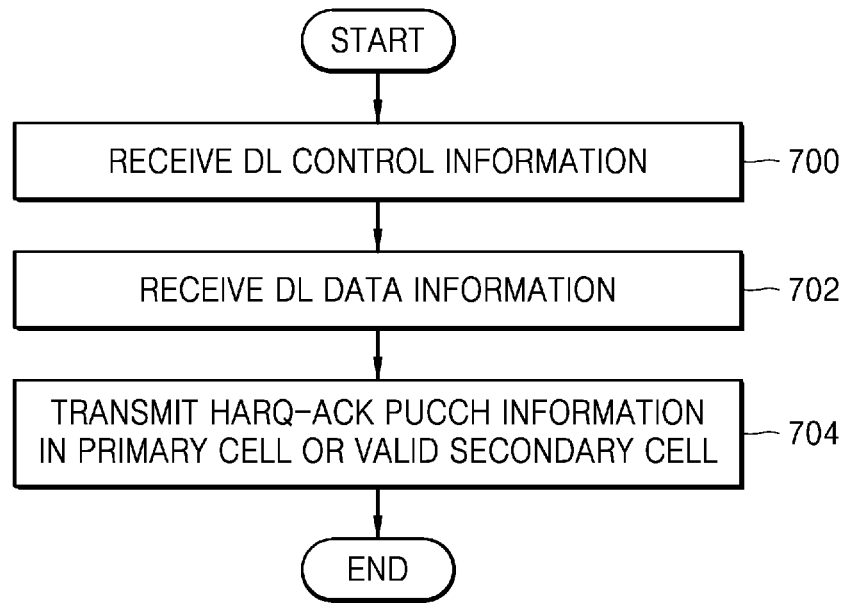
FIG. 7 is a flowchart illustrating a user equipment (UE) operation of transmitting HARQ-ACK information in a situation in which carriers involved in carrier aggregation have different TDD structures, according to an embodiment of the disclosure.

FIG. 7 is a flowchart illustrating a UE operation of transmitting HARQ-ACK information in a situation where carriers involved in CA have different TDD structures, according to an embodiment of the disclosure.

As described above in connection with FIG. 6, the UE may receive, from the BS, DL control information on a DL control channel configured from one or multiple cells while supporting and being configured with CA, in operation 700.

In operation 702, the UE may receive DL data information in a self-carrier scheduling scheme or cross-carrier scheduling scheme according to information indicated in the DL control information. The self-carrier scheduling is a scheduling scheme in which DL control information and data information are transmitted or received in the same cell, and the cross-carrier scheduling is a scheduling scheme in which DL control information and data information are transmitted or received in different cells. The UE may transmit a PUCCH including HARQ-ACK information about reception of the DL data information to the BS in a particular cell.

In operation 704, the UE may transmit, to the BS, the PUCCH including the HARQ-ACK information in the primary cell or a valid secondary cell according to at least one of the schemes as described above in connection with FIG. 6.

Figure 8:
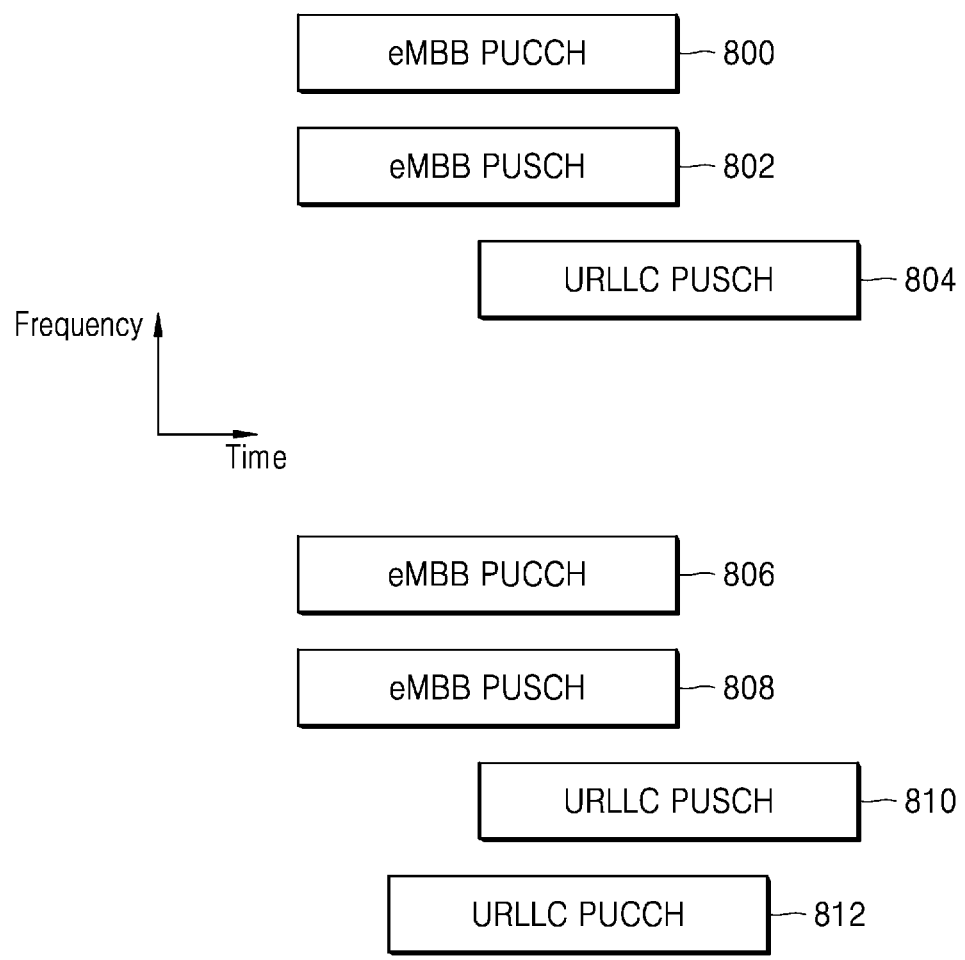
FIG. 8 illustrates a situation in which uplink control channel and data channel having different priorities overlap from the perspective of time resources in a cell, according to an embodiment of the disclosure.

FIG. 8 illustrates a situation where UL control channel and data channel having different priorities overlap from the perspective of time resources in a cell, according to an embodiment of the disclosure.

Referring to FIG. 8, the UE may report the BS of UE capability enabling simultaneous transmission of a PUCCH and a PUSCH in one cell, and when the BS configures simultaneous transmission of the PCCH and the PUSCH for the UE, the UE is able to perform simultaneous transmission of the PUCCH and the PUSCH. Furthermore, priorities of the PUCCH and the PUSCH may be determined according to a higher layer signal or L1 signal. For example, whether the PUCCH has a high priority (e.g., URLLC PUCCH) or low priority (e.g., eMBB PUCCH) may be determined according to DCI detected from higher layer configuration information relating to CORESET/search space, DCI format information, an RNTI, or DCI field information in the L1 signal, and whether the PUSCH also has a high priority (e.g., URLLC PUSCH) or low priority (e.g., eMBB PUSCH) may be determined. Although FIG. 8 describes two of the priority levels, more than two priority levels may also be equally applied in the disclosure.

Referring to FIG. 8, there may be an occasion when an eMBB PUCCH 800, an eMBB PUSCH 802, and a URLLC PUSCH 804 are scheduled by the BS. When multiplexing is possible only for a PUCCH and a PUSCH having the same priority, the UE may transmit UCI (hereinafter, interchangeably used with UL control information) included in the eMBB PUCCH by adding the UCI to the eMBB PUSCH 802. However, simultaneous transmission of the eMBB PUSCH and the URLLC PUSCH is not supported by the UE, so the UE is prevented from adding the UCI information included in the eMBB PUCCH to the eMBB PUSCH. Accordingly, the UE drops the eMBB PUSCH 802 and performs simultaneous transmission of the eMBB PUCCH 800 and the URLLC PUSCH 804.

Alternatively, when the UE is able to perform simultaneous transmission of the PUSCH and the PUCCH in one cell, the UE may determine whether among all the PUSCHs and PUCCHs received from the BS, the PUSCHs overlap each other or PUCCHs overlap each other in time resources. For example, in FIG. 8, shown is a situation where an eMBB PUCCH 806, an eMBB PUSCH 808, a URLLC PUSCH 810, and a URLLC PUCCH 812 overlap in at least one symbol. In this situation, the UE may support at least one of the following two methods:

Method 8-1: a method of finally transmitting one PUSCH and one PUCCH after the dropping operation based on priority of each PUSCH/PUCCH may be taken into account. When the overlapping situation occurs as in FIG. 8, the UE may drop the eMBB PUCCH 806 and transmit the URLLC PUCCH 812 from the PUCCH perspective, and drop the eMBB PUSCH 808 and transmit the URLLC PUSCH 810 from the PUSCH perspective. An advantage of method 8-1 is that the UE does not need to separately take into account whether to multiplex PUSCH and PUCCH.

Method 8-2: The emBB PUCCH is dropped in method 8-1, but when the eMBB PUCCH information includes HARRQ-ACK feedback information, the BS has no choice but to perform retransmission of all PDSCHs related to the HARQ-ACK information. To solve this problem, a method of supporting multiplexing of PUCCH/PUSCH with a high priority and transmitting a PUCCH with a low priority separately may be considered.

Referring to FIG. 8, UCI information included in the URLLC PUCCH 812 is added to and transmitted in the URLLC PUSCH 810, and the eMBB PUCCH 806 is transmitted. And then, as the eMBB PUSCH 808 has a lower priority than the URLLC PUSCH 810, the eMBB PUSCH 808 is dropped. Hence, method 8-2 has an advantage in that the number of channels to be dropped is reduced as compared to method 8-1.

Method 8-3: similar to method 8-1 but the eMBB PUCCH may be transmitted in another cell. As the eMBB PUCCH may not be transmitted in the situation of FIG. 8 similar to the method as described above in connection with FIG. 6, the UE transmits the eMBB PUCCH in a secondary cell other than the primary cell when the UE supports CA.

The PUCCH/PUSCH as described above in connection with FIG. 8 may be resources scheduled by DCI or configured by a higher layer signal in advance.

Figure 9:
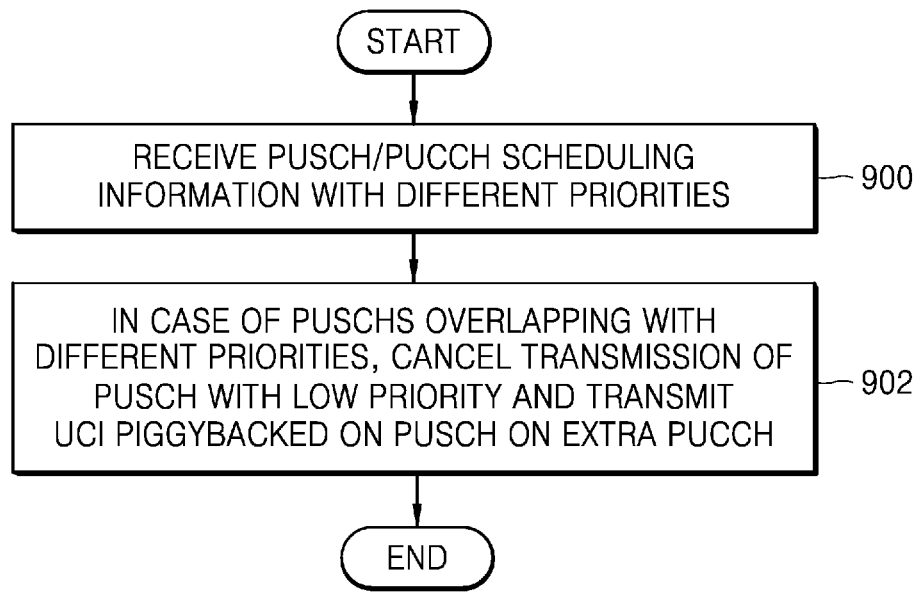
FIG. 9 is a flowchart illustrating an operation of a UE when uplink control channel and data channel having different priorities overlap from the perspective of time resource in a cell, according to an embodiment of the disclosure.

FIG. 9 is a flowchart illustrating an operation of a UE when UL control channel and data channel having different priorities overlap from the perspective of time resource in a cell, according to an embodiment of the disclosure.

In operation 900, the UE may receive scheduling information for PUSCHs/PUCCHs with different priorities.

In operation 902, when PUSCHs with different priorities overlap in time resources, transmission of a PUSCH with a low priority may be canceled and UCI piggybacked on the PUSCH may be transmitted on a separate PUCCH. Alternatively, according to one of the methods as described above in connection with FIG. 8, the UE may drop PUCCHs or PUSCHs having different priorities or drop some PUCCHs or PUSCHs through a multiplexing scheme, and transmit the other PUCCH(s) or PUSCH(s) not dropped to the BS.

In 5G NR, with repetitive transmission, one PUSCH or PUCCH may have a priority index value of 0 or 1. When the priority index value is not provided for one PUSCH or one PUCCH, the priority index may be 0. It is, of course, not limited thereto. When a UE monitors a PDCCH for one of DCI format 0_1/DCI format 1_1 or DCI format 0_2/DCI format 1_2 in an activated DL BWP, the priority index value may be provided in a priority indicator field in the DCI format. When a UE reports UE capability for PCCH monitoring for both the DCI format 0_1/DCI format 1_1 and the DCI format 0_2/DCI format 1_2 in an activated DL BWP, and receives associated higher layer signal configuration from the BS, the DCI format 0_1 or DCI format 0_2 may schedule transmission of a PUSCH having a certain priority index, and the DCI format 1_1 or DCI format 1_2 may schedule reception of a PDSCH and indicate related transmission of the PUCCH including HARQ-ACK information having the certain priority index.

When the UE monitors the DCI format 0_1 and the DCI format 0_2 on a PDCCH in an activated BWP, it may be defined in the standard that the priority index value for the PUSCH scheduled in the DCI format 0_1 is set to 0 or 1, the priority index value for the PUSCH scheduled in the DCI format 0_2 is set to 1 or 0, or the priority index value of the PUSCH scheduled in the DCI format 0_1 is set to 0 and the priority index value of the PUSCH scheduled in the DCI format 0_2 is set to 1 by a higher layer signal. When the UE monitors the DCI format 0_1 and the DCI format 0_2 on a PDCCH in an activated BWP, the UE does not expect to receive higher layer configuration information to have the same priority index value for the DCI format 0_1 and the DCI format 0_2.

When the UE monitors the DCI format 1_1 and the DCI format 1_2 on a PDCCH in an activated BWP, it may be defined in the standard that the priority index values for a PDSCH scheduled in the DCI format 1_1 and a PUCCH including HARQ-ACK information relating to the PDSCH are set to 0 or 1, the priority index values for a PDSCH scheduled in the DCI format 1_2 and a PUCCH including HARQ-ACK information relating to the PDSCH are set to 1 or 0, the priority index values of the PDSCH scheduled in the DCI format 1_1 and a PUCCH including HARQ-ACK information relating to the PDSCH are set to 0, or the priority index values of the PDSCH scheduled in the DCI format 1_1 and a PUCCH including HARQ-ACK information relating to the PDSCH are set to 1 by a higher layer signal. When the UE monitors the DCI format 1_1 and the DCI format 1_2 on a PDCCH in an activated BWP, the UE may not expect to receive higher layer configuration information to have the same priority index value for the DCI format 1_1 and the DCI format 1_2.

After the UE solves overlapping between a plurality of PUCCH or PUSCH transmissions having the same priority index, when the UE intends to transmit the first PUCCH having a high priority index value and a PUSCH or the second PUCCH having a low priority index value, but the first PUCCH transmission overlaps the transmission of the PUSCH or the second PUCCH in time resources, the UE may not transmit the PUSCH or the second PUCCH.

Alternatively, after the UE solves overlapping between a plurality of PUCCH or PUSCH transmissions having the same priority index, when transmissions of a PUSCH having a high priority index value, a PUCCH having a low priority index value, and a PUSCH overlap transmission of a PUCCH in time resources, the UE may not transmit the PUCCH.

Alternatively, after the UE solves overlapping between a plurality of PUCCH or PUSCH transmissions having the same priority index, when the UE intends to transmit a first PUSCH having a high priority index value in a serving cell and a second PUSCH having a low priority index value in the same serving cell, but the transmission of the first PUSCH overlap the transmission of the second PUSCH in time resources, the UE may not transmit the second PUCCH. At least one of the first PUSCH or the second PUSCH may not be scheduled by a DCI format, or both the first and second PUSCHs may be scheduled by a DCI format.

Figure 10:
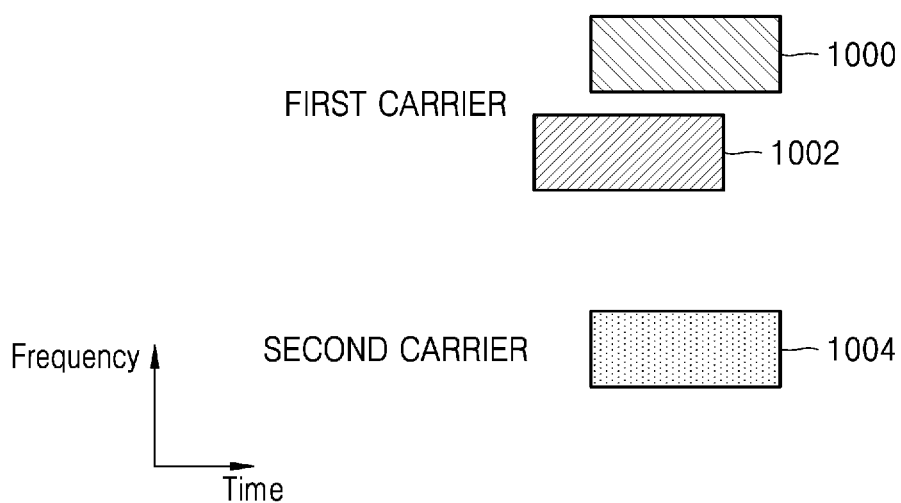
FIG. 10 illustrates a situation in which uplink control channel and data channel are scheduled, according to an embodiment of the disclosure.

FIG. 10 illustrates a situation where UL control channel and data channel are scheduled, according to an embodiment of the disclosure.

Referring to FIG. 10, an occasion when UL channels 1000 and 1002 are scheduled at a first carrier and d UL channel 1004 is scheduled at a second carrier is shown. The UL channel 1000 is a control channel with a high priority index, the UL channel 1002 is a control channel with a low priority index, and the UL channel 1004 is a data channel with the high priority index. In other words, the UL channel 1000 scheduled at the first carrier and the UL channel 1004 scheduled at the second carrier have the same priority index, and the UL channel 1002 scheduled at the first carrier has a priority index lower than the former priority index.

The first carrier is a Pcell or a primary cell, and the second carrier is a Scell or a secondary cell. When in a 5G NR operation that supports Rel-15/16, a PUCCH (UL control channel) including HARQ information generally scheduled at the first carrier and a PUSCH (UL data channel) scheduled at the second carrier at least partially overlap each other, the UE may transmit the PUSCH of the second carrier by adding the HARQ-ACK information to the PUSCH and drop the PUCCH of the first carrier. This is called piggyback.

However, when the PUSCH and the PUCCH have different priority information, a channel with a lower priority may be dropped. For example, when the PUCCH including the HARQ information with a low priority is scheduled at the first carrier and the PUSCH with a high priority is scheduled at the second carrier, the UE may drop the PUCCH as well as the HARQ information and transmit only the PUSCH rather than having the HARQ information piggybacked on the PUSCH.

In an embodiment of the disclosure, to avoid the problem of dropping the PUCCH including the HARQ information, the UE may transmit the PUCCH including the HARQ information with a low priority at the first carrier and transmit the PUSCH with the high priority at the second carrier, instead of dropping the PUCCH including the HARQ information with the low priority. When a resource for a UL control signal transmitted on a UL control channel and a resource for a UL data signal transmitted on a UL data channel having a different priority from the UL control channel overlap each other in the time domain, the UL control signal and the UL data signal are simultaneously transmitted at the first carrier and the second carrier, respectively, to the BS, and this operation is called simultaneous transmission of PUCCH and PUSCH (or operation 10-1 for convenience of explanation).

In Rel-15/16 5G NR, the UE may have two cell groups and may transmit one PUCCH for each cell group. This operation is allowed in the case that the first carrier is allocated for the first cell group and the second carrier is allocated for the second cell group. However, it may not be allowed in the same cell group. Hence, there may be a demand for the simultaneous transmission of PUCCH and PUSCH even in the same cell group in such a situation. In summary, in a case that a PUCCH and a PUSCH are scheduled at different carriers but overlap each other in one cell group, the UE may transmit control information included in the PUCCH by piggybacking the control information on the PUSCH when the PUCCH and the PUSCH have the same priority information, and may simultaneously transmit the PUCCH and the PUSCH at their respective carriers or transmit one of the PUSCH and the PUCCH that has higher priority information and drop the other with lower priority information according to UE capability or BS configuration when the PUCCH and the PUSCH have different priorities.

Furthermore, as in FIG. 10, when different PUCCHs overlap at one carrier, each control information is generally added to and transmitted in one PUCCH by multiplexing in the Rel-15/16 5G NR. However, when the PUCCHs each have different priority information, the UE drops the PUCCH with a lower priority and the corresponding control information and transmits the PUCCH with a higher priority and the corresponding control information. As for HARQ information with a lower priority, when the HARQ information overlaps the PUCCH with a higher priority, the HARQ information is dropped. Accordingly, to solve this problem, pieces of HARQ information with different priorities may be multiplexed and transmitted in one PUCCH. When a resource for a first UL control signal transmitted in a first UL control channel and a resource for a second UL control signal transmitted in a second UL control channel having a higher priority than the first UL control channel overlap in the time domain, the first UL control channel and the second UL control channel are multiplexed, and the first UL control signal and the second UL control signal are simultaneously transmitted to the BS on the one multiplexed UL control channel, which is called multiplexing of control information with different priorities (or operation 10-2 for convenience of explanation).

When the UE may support the operation 10-1 and the operation 10-2 as UE capability, and may be configured to perform both the operations 10-1 and 10-2 through a higher layer signal defined for them, the UE may first multiplex a PUCCH 1000 and a PUCCH 1002 with different priorities at a first carrier according to the operation 10-2 and transmit a result of the multiplexing on one PUCCH, or piggyback and transmit control information included in the PUCCH 1000 of the first carrier on a PUSCH 1004 of the second carrier having the same priority according to the operation 10-1 because the PUSCH 1004 of the second carrier and the PUCCH 1002 of the first carrier have different priorities. Accordingly, when both the operation 10-1 and the operation 10-2 are activated, the UE needs to determine which one of them is to be performed first, and the UE may operate according to at least one or a combination of the following methods:

Method 10-1: The operation 10-1 has precedence over the operation 10-2. In such a situation as in FIG. 10, the UE first multiplexes the PUCCH 1000 and the PUSCH 1004 with the same priority information, and specifically, transmits control information included in the PUCCH 1000 at the second carrier by piggybacking the control information on the PUSCH 1004. Accordingly, the UE simultaneously transmits the PUCCH 1002 with lower priority information at the first carrier and the PUSCH 1004 with higher priority information at the second carrier. In a case that there is no PUSCH 1004 of the second carrier in FIG. 10, the UE multiplexes pieces of control information included in the PUCCH 1000 and the PUCCH 1002 with different priorities at the first carrier and transmits a result of the multiplexing on one PUCCH.

Method 10-2: The operation 10-2 has precedence over the operation 10-1. In the situation as in FIG. 10, the UE first multiplexes pieces of control information included in the PUCCH 1000 and the PUCCH 1002 with different priorities at the same carrier and transmits a result of the multiplexing on one PUCCH. This multiplexed PUCCH is called PUCCH X. The PUCCH X may be the same resource as the PUCCH 1000 or the PUCCH 1002, or may be a third PUCCH resource different from the PUCCHs 1000 and 1002. Furthermore, the PUCCH X may conform to the priority of the PUCCH 1000 or the priority of the PUCCH 1002. When the PUCCH X has the same priority as a PUSCH of the second carrier, control information included in the PUCCH X is piggybacked and transmitted on the PUSCH of the second carrier and the UE drops the PUCCH X. When the PUCCH X has a different priority from the PUSCH of the second carrier, the UE simultaneously transmits the PUCCH X of the first carrier and the PUSCH of the second carrier.

Method 10-3: The UE may select the method 10-1 or the method 10-2 based on a control information type, a UCI size or configuration, or UE capability. For example, when at least one piece of control information includes HARQ information, the UE may apply the method 10-1, and otherwise, the UE may apply the method 10-2. It is merely an example, and the method 10-2 may be applied to the former case while the method 10-1 may be applied to the latter case and the control information may include CSI, SR, or BFR instead of the HARQ information. In another example, when at least one PUCCH is in a particular PUCCH format (e.g., PUCCH format 0 or 2), the UE may apply the method 10-1, and otherwise, the UE may apply the method 10-2. It is merely an example, and the method 10-2 may be applied to the former case while the method 10-1 may be applied to the latter case and other PUCCH formats may be used instead of the PUCCH format. In still another example, when a UCI size of at least one PUCCH is larger than a particular value, the UE may apply the method 10-1, and otherwise, the UE may apply the method 10-2. It is merely an example, and the method 10-2 may be applied to the former case while the method 10-1 may be applied to the latter case and the UCI size may be replaced by a total UCI size of all the PUCCHs or a UCI size of some PUCCHs. In yet another example, when the method 10-1 is indicated by a higher layer signal or L1 signal, the UE may apply the method 10-1, and otherwise, the UE may apply the method 10-2. It is merely an example, and the method 10-2 may be applied to the former case while the method 10-1 may be applied to the latter case, the higher layer signal may be included in a BWP or cell configuration information, and the L1 signal may be determined by a DCI format, a particular DCI field, or a search space in which DCI is transmitted.

Although a PUCCH including HARQ information is focused in the above examples, the disclosure is not limited thereto and may be equally applied to any UL control information such as CSI, SR, BFR, etc., that may be transmitted on a PUCCH. Having priority information in the above examples means that the priority information is also delivered by a higher layer signal or DCI information when the related channel is scheduled. For example, when the UE is scheduled with the UL channel, whether the related channel has higher priority information or lower priority information may be determined through a particular field in DCI or RRC. Although the first carrier and the second carrier are assumed to be included in one cell group in the above examples, the disclosure may be fully applied to a case that the first and second carriers are included in different cell groups. There are two carriers illustrated in the above examples, but the disclosure will be fully applied to two or more carriers.

Figure 11:
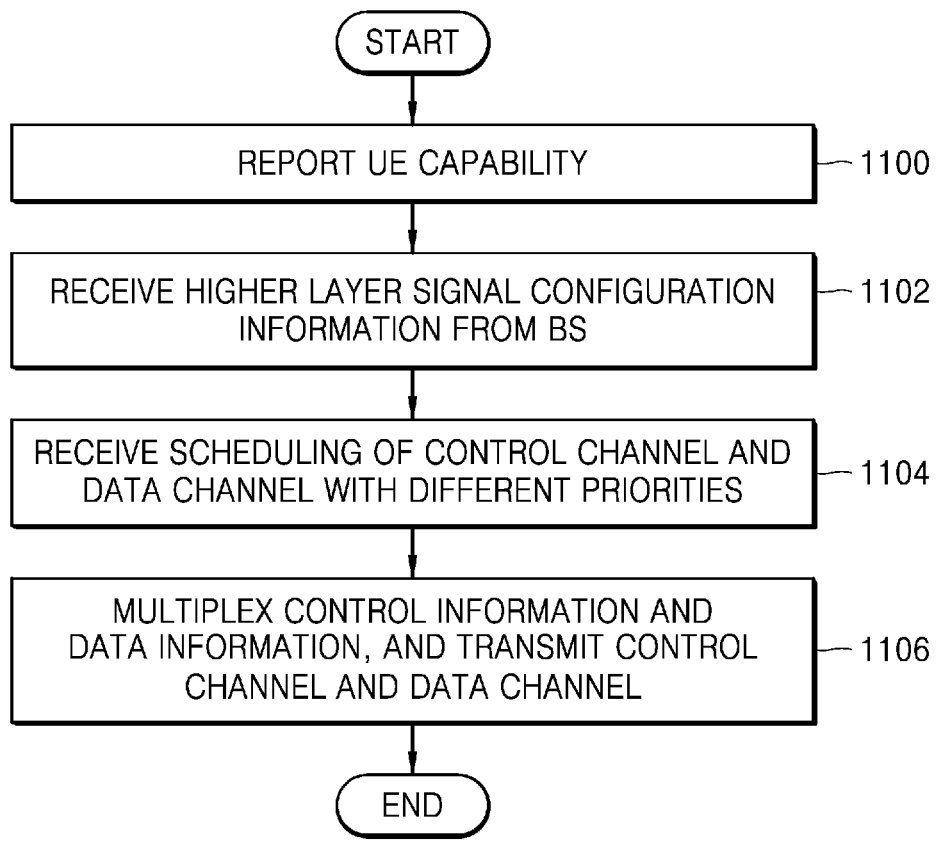
FIG. 11 is a flowchart illustrating a UE operation when uplink control channel and data channel having different priorities overlap, according to an embodiment of the disclosure.

FIG. 11 is a flowchart illustrating a UE operation when UL control channel and data channel having different priorities overlap, according to an embodiment of the disclosure.

Referring to FIG. 11, in operation 1100, the UE may report the BS of UE capability for the operation 10-1 or the operation 10-2. For example, when a resource of a UL control signal transmitted on a UL control channel and a resource of a UL data signal transmitted on a UL data channel having a different priority from the UL control channel are allocated at the first carrier and the second carrier, respectively, to overlap in the time domain, the UE may report the BS of the UE capability indicating that the UE supports simultaneous transmission of the UL control signal and the UL data signal. In another example, when a resource of a first UL control signal transmitted on a first UL control channel and a resource of a second UL control signal transmitted on a second UL control channel having a higher priority than the first UL control channel are allocated to overlap in the time domain, the UE may report the BS of the UE capability indicating that the UE supports simultaneous transmission of the first UL control signal and the second UL control signal.

Subsequently, in operation 1102, the BS may configure the operation 10-1 or the operation 10-2 or both through a higher layer signal. Alternatively, it may be regarded as being automatically configured based on UE capability reported by the UE without extra configuration of the BS.

Furthermore, in operation 1104, when configured with a plurality of carriers, the UE may receive scheduling information relating to allocation of a UL control channel (PUCCH) and a data channel (PUSCH) for each carrier.

When in operation 1106, the scheduled plurality of PUCCHs and PUSCHs overlap and some of them have different priority information, the UE may apply at least one of the methods 10-1 or 10-3 as described above.

Although the above description is focused on the UE operation, the BS operation is also similar to what is described above for the UE operation. Specifically, the BS may receive UE capability information from the UE, determine whether to support the operation 10-1 or 10-2, and transmit each configuration information to the UE. After this, the BS transmits control information scheduling the PUSCH and the PUCCH for the UE that operates the plurality of carriers. When the plurality of PUSCHs and PUCCHs overlap and have different priority information, the UE may apply at least one of the methods 10-1 to 10-3. It is natural to apply the same method because the BS and the UE need to be operated with matching operations.

Figure 12:
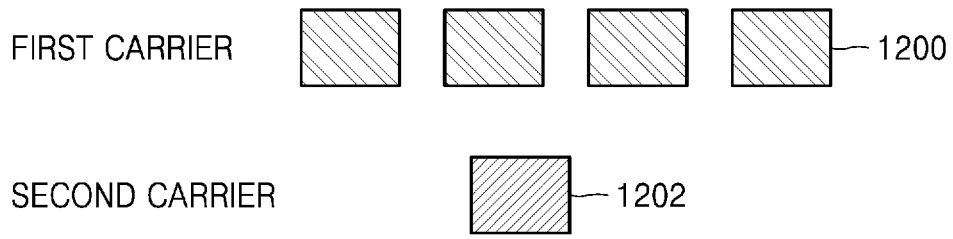
FIG. 12 illustrates a situation in which uplink control channel and data channel are scheduled, according to an embodiment of the disclosure.

FIG. 12 illustrates a situation where UL control channel and data channel are scheduled, according to an embodiment of the disclosure.

Referring to FIG. 12, a PUCCH 1200 is scheduled to be repeatedly transmitted at a first carrier and a PUSCH 1202 is scheduled at a second carrier. The first and second carriers are included in the same cell group. When a PUCCH is repeatedly transmitted in the Rel-15/16 5G NR, the UE drops a PUSCH that overlaps the repeatedly transmitted PUCCH in at least one symbol. Accordingly, when the PUSCH 1202 and the PUCCH 1200 have the same priority information, the BS may schedule the PUSCH 1202 at the second carrier in FIG. 12 but the UE drops the PUSCH 1202 while transmitting the PUCCH 1200 because the PUSCH 1202 overlaps the PUCCH 1200. The same is true of a case that the priority information of the PUSCH 1202 is lower than that of the PUCCH 1200. On the other hand, when the priority information of the PUSCH 1202 is higher than that of the PUCCH 1200, the UE may drop the second PCCH repetitive transmission that overlaps the PUSCH 1202 and transmit the PUSCH 1202. To drop the second PUCCH repetitive transmission, it needs to be dropped at least after a symbol overlapping the PUSCH.

When the UE is able to support the operation 10-1 as its capability as described above in connection with FIG. 10, it may be applied to a case that the PUCCH 1200 and the PUSCH 1202 have the same or different priority information as described in FIG. 12. Basically in the operation 10-1, simultaneous transmission is possible only when a PUCCH and a PUSCH are scheduled at different carriers and have different priority information, but simultaneous transmission of the PUCCH and the PUSCH at respective carriers may be possible when the PUCCH and the PUSCH have the same priority information but the resource is allocated by repetitive transmission of the PUCCH. This may solve the problem of dropping the PUSCH 1202 having been scheduled. Although it is described in FIG. 12 that there is single transmission of the PUSCH, the disclosure may be extended to a case of repetitive transmission.

Figure 13:
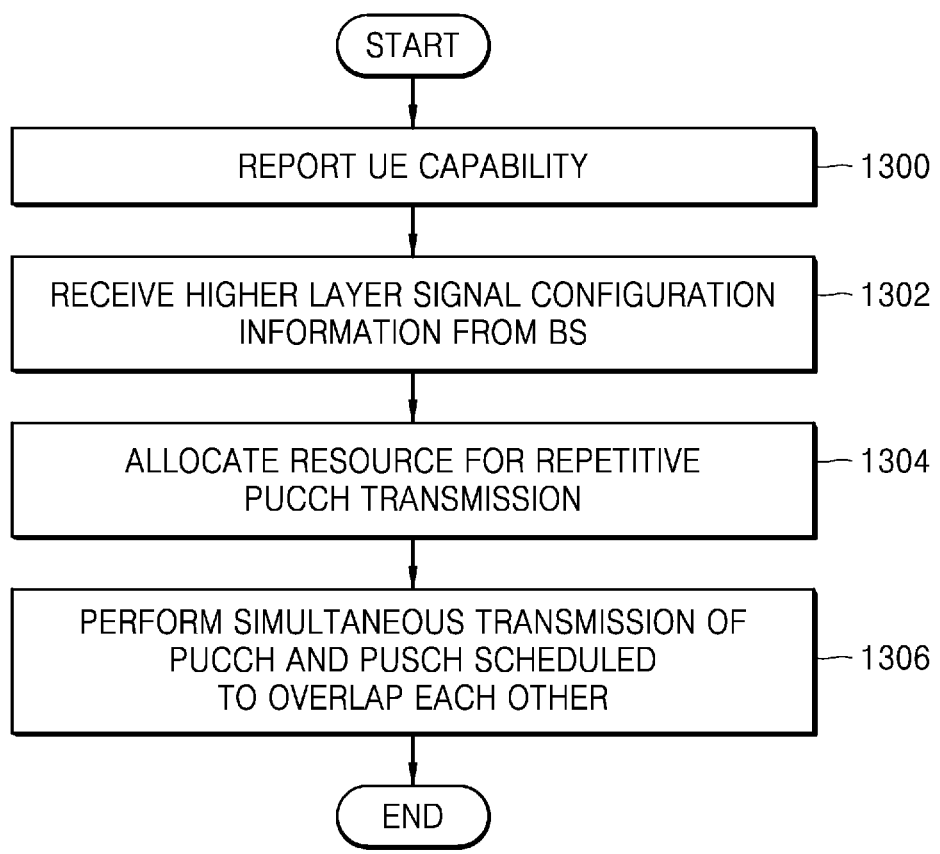
FIG. 13 is a flowchart illustrating a UE operation when an uplink control channel repeatedly transmitted overlaps a data channel, according to an embodiment of the disclosure.

FIG. 13 is a flowchart illustrating a UE operation when a UL control channel repeatedly transmitted overlaps a data channel, according to an embodiment of the disclosure.

In operation 1300, the UE may report the BS of UE capability for the operation 10-1.

Subsequently, in operation 1302, the UE may receive, from the BS, a higher layer signal about whether the operation 10-1 is activated or deactivated. Without the operation 10-1, the UE may regard it as being deactivated or may regard the reported UE capability as being configured.

In operation 1304, the UE may receive PUCCH repetitive transmission scheduling information. The information may be included in DCI or configured by RRC.

In operation 1306, no matter whether the PUSCH of the second carrier overlapping the PUCCH repetitive transmission scheduled at the first carrier has the same or different priority information, the UE may perform simultaneous transmission based on the operation 10-1.

Although FIG. 13 is described by focusing on the UE operation, the BS operation may also be applied thereto. The BS may receive capability information about the operation 10-1 from the UE and configure a related higher layer signal. When the BS schedules PUCCH repetitive transmission for the first carrier and schedules an overlapping PUSCH for the second carrier, the BS receives both the PUCCH and the PUSCH because it configures the operation 10-1 for the UE. When the UE does not support the operation 10-1, it may be reasonable for the BS to avoid scheduling a PUSCH that overlaps the PUSCH.

Figure 14:
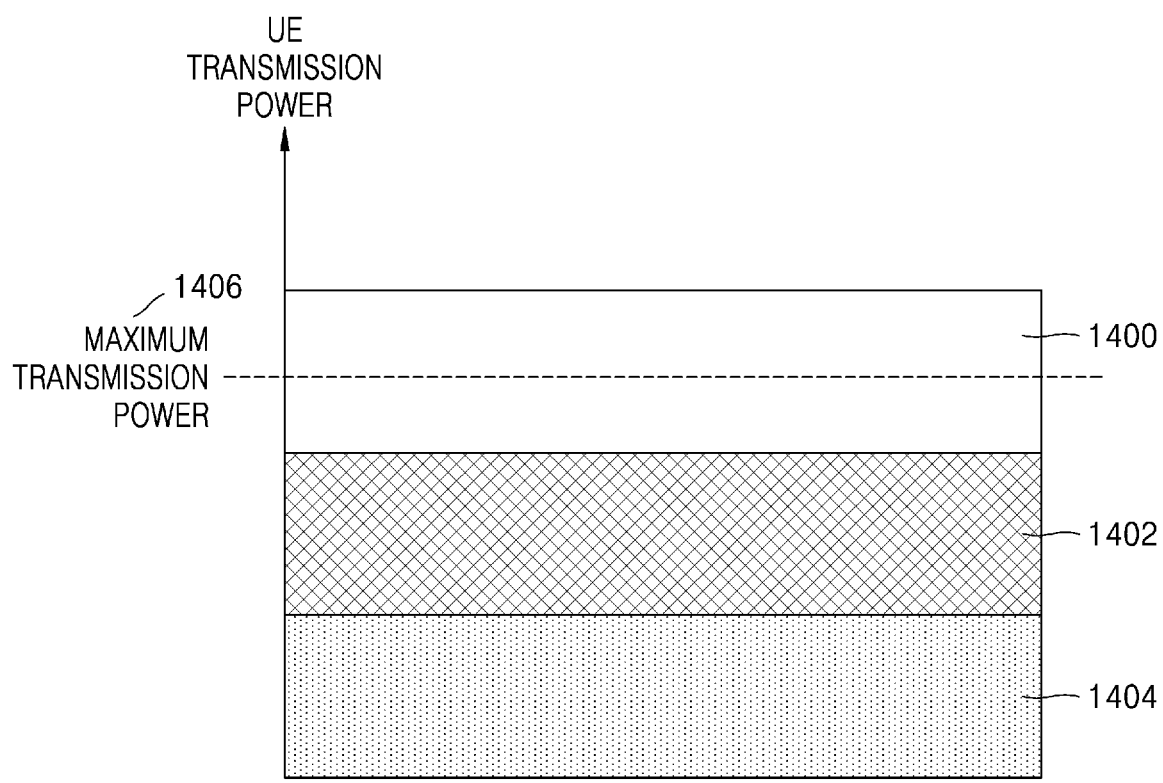
FIG. 14 illustrates a transmit power allocation method for each channel based on maximum UE transmit power when a plurality of uplink channels are scheduled for different carriers, according to an embodiment of the disclosure.

FIG. 14 illustrates a transmit power allocation method for each channel based on maximum UE transmit power when a plurality of UL channels are scheduled for different carriers, according to an embodiment of the disclosure.

In a situation where two UL carriers connected to one cell are configured or CA is configured, when a total UE transmission power at which the UE transmits a PUSCH, a PUCCH, a physical random access channel (PRACH) or a sounding reference signal (SRS) scheduled all over the carriers at a transmission time i exceeds Pc,max(i), the UE may allocate transmission power for transmission of each of the PUSCH, PUCCH, PRACH and SRS based on the following priorities so that the transmission power is equal to or less than Pc,max(i).

1. Transmission of the PRACH in Pcell (hereinafter, first priority)
2. Transmission of the PUCCH or PUSCH having higher priority information (hereinafter, second priority)
3. Transmission of the PUCCH or PUSCH having the same priority information (hereinafter, third priority)
3-1. Transmission of PUCCH including at least one of HARQ information, SR, or LLR, or transmission of PUSCH including HARQ information
3-2. Transmission of PUCCH including CSI information, or transmission of PUSCH including CSI information
3-3. Transmission of PUSCH without HARQ or CSI information, or PUSCH of Pcell in the case of Type-2 random access
4. Aperiodic transmission of SRS>transmission of semi-permanent/permanent SRS or PRACH in a cell other than Pcell (hereinafter, fourth priority)

To determine a total transmission power for a symbol at transmission time i, the UE does not consider transmission power for transmissions starting after the symbol at transmission time i. In the case of the same priority and CA, the UE gives priority to transmission of the primary cell in a master cell group (MCG) or a secondary cell group (SCG) over the secondary cell. When one cell is connected to two UL carriers, the UE prioritizes transmission power allocation to a carrier to transmit the PUCCH. When neither of the two carriers has PUCCH related configuration, the UE gives priority to transmission of a non-supplementary carrier over transmission of a supplementary carrier. The UE may restrict transmission power based on descriptions in Table 7 below.

TABLE 7

Prioritizations for transmission power reductions
For single cell operation with two uplink carriers or for operation with carrier aggregation, if a total UE transmit power for PUSCH or PUCCH or PRACH or SRS transmissions on serving cells in a frequency range in a respective transmission occasion i would exceed $\hat{P}_{CMAX}(i)$ where $\hat{P}_{CMAX}(i)$ is the linear value of $P_{CMAX}(i)$ in transmission occasion i as defined in [8-1, TS 38.101-1] for FR1 and [8-2, TS38.101-2] for FR2, the UE allocates power to PUSCH/PUCCH/PRACH/SRS transmissions according to the following priority order (in descending order) so that the total UE transmit power for transmissions on serving cells in the frequency range is smaller than or equal to $\hat{P}_{CMAX}(i)$ for that frequency range in every symbol of transmission occasion i. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.
- PRACH transmission on the PCell
- PUCCH or PUSCH transmissions with higher priority index according to Clause 9
- For PUCCH or PUSCH transmissions with same priority index
    - PUCCH transmission with HARQ-ACK information, and/or SR, and/or LRR, or PUSCH transmission with HARQ-ACK information
    - PUCCH transmission with CSI or PUSCH transmission with CSI
    - PUSCH transmission without HARQ-ACK information or CSI and, for Type-2 random access procedure, PUSCH transmission on the PCell
- SRS transmission, with aperiodic SRS having higher priority than semi-persistent and/or periodic SRS, or PRACH transmission on a serving cell other than the PCell
In case of same priority order and for operation with carrier aggregation, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

Referring to FIG. 14 in conjunction with the aforementioned description and Table 7, the UE is scheduled with first to third UL channels 1400, 1402 and 1404 over different carriers at a particular transmission time i. As transmission of all the scheduled UL channels from the UE exceeds maximum UE transmission power 1406, the UE needs to drop a lower priority channel. According to the above mentioned priorities, a sequence of the third UL channel 1404, the second UL channel 1402, and the first UL channel 1400 are considered for transmission.

For example, transmission of the third UL channel 1404 and the second UL channel 1402 does not exceed the maximum UE transmission power 1406, so the UE may finally transmit the third UL channel 1404 and the second UL channel 1402 while dropping the first UL channel 1400. The first to third UL channels 1400, 1402 and 1404 may each correspond to at least one of an SRS, a PUCCH, a PUSCH, or a PRACH.

The Rel-15/16 5G NR considers a situation where the PUCCH and the PUSCH each have pieces of information basically having the same priority multiplexed. Specifically, pieces of control information having the same priority information are multiplexed on the PUCCH, and data and control information having the same priority information are multiplexed on the PUSCH. In a case that pieces of control information having different priorities are multiplexed on the PUCCH or data and control information having different priorities are multiplexed on the PUSCH, the UE needs to set priorities for transmission power of the PUCCH or the PUSCH. Hence, the UE may set priorities for the transmission power based on at least one or a combination of the following methods:

For convenience of explanation, the PUCCH including pieces of control information with different priorities is also expressed as PUCCH with mixed priorities, and the PUSCH including control information and data with different priorities is also expressed as PUSCH with mixed priorities.

Method 14-1: The PUCCH with mixed priorities and the PUSCH with mixed priorities have priorities between the second and third priorities in the transmission power priority order. In other words, they are regarded as being lower than a high priority PUCCH or PUSCH and higher than a low priority PCCH or PUSCH.

TABLE 8

Prioritizations for transmission power reductions
For single cell operation with two uplink carriers or for operation with carrier aggregation, if a total UE transmit power for PUSCH or PUCCH or PRACH or SRS transmissions on serving cells in a frequency range in a respective transmission occasion i would exceed $\hat{P}_{CMAX}(i)$, where $\hat{P}_{CMAX}(i)$ is the linear value of $P_{CMAX}(i)$ in transmission occasion i as defined in [8-1, TS 38.101-1] for FR1 and [8-2, TS38.101-2] for FR2, the UE allocates power to PUSCH/PUCCH/PRACH/SRS transmissions according to the following priority order (in descending order) so that the total UE transmit power for transmissions on serving cells in the frequency range is smaller than or equal to $\hat{P}_{CMAX}(i)$ for that frequency range in every symbol of transmission occasion i. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.
 - PRACH transmission on the PCell
 - PUCCH or PUSCH transmissions with higher priority index according to Clause 9
 - PUCCH or PUTSCH transmissions with mixed priority index(es) according to Clause 9
   - For PUCCH or PUSCH transmissions with same priority index
     - PUCCH transmission with HARQ-ACK information, and/or SR, and/or LRR, or PUSCH transmission with HARQ-ACK information
     - PUCCH transmission with CSI or PUSCH transmission with CSI
     - PUSCH transmission without HARQ-ACK information or CSI and, for Type-2 random access procedure, PUSCH transmission on the PCell
 - SRS transmission, with aperiodic SRS having higher priority than semi-persistent and/or periodic SRS, or PRACH transmission on a serving cell other than the PCell
In case of same priority order and for operation with carrier aggregation, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

Method 14-2: The PUCCH with mixed priorities and PUSCH with mixed priorities are regarded as having equal transmission power priorities to the high priority PUCCH or PUSCH. Hence, when at least one of pieces of information multiplexed in a PUCCH or PUSCH has a high priority, the PUCCH or PUSCH is regarded as a channel having high priority information and the UE performs matching transmission power allocation.

Method 14-3: The PUCCH with mixed priorities and PUSCH with mixed priorities are regarded as having equal transmission power priorities to the low priority PUCCH or PUSCH. Hence, when at least one of pieces of information multiplexed in a PUCCH or PUSCH has a low priority, the PUCCH or PUSCH is regarded as a channel having low priority information and the UE performs matching transmission power allocation.

Method 14-4: At least one of the method 14-1 or 14-3 is determined implicitly or explicitly. For example, according to the type of control information included in the PUCCH or PUSCH, the method 14-2 or 14-3 may be applied. When a PUSCH having low priority information includes HARQ-ACK information with a high priority, the PUSCH may be estimated as in the method 14-2. When a PUSCH having high priority information includes HARQ-ACK information with a low priority, the PUSCH may be estimated as in the method 14-3. At least one of the method 14-2 or 14-3 may be selected by a higher layer signal or L1 signal.

In another example, according to the priority of data information included in the PUSCH, the method 14-2 or the method 14-3 may be determined. When a PUSCH having low priority information includes HARQ-ACK information with a high priority, the PUSCH may be estimated as in the method 14-3. When a PUSCH having high priority information includes HARQ-ACK information with a low priority, the PUSCH may be estimated as in the method 14-2. In yet another example, when pieces of control information having different priorities overlap on one PUCCH, the UE may follow a priority of particular control information. For example, when HARQ and CSI having different priorities are multiplexed and mapped on a PUCCH, the UE may follow a priority of the HARQ. It is merely an example, and the UE may follow a priority of at least one piece of control information such as CSI, SR, or location-report-request (LRR) apart from the HARQ.

Figure 15:
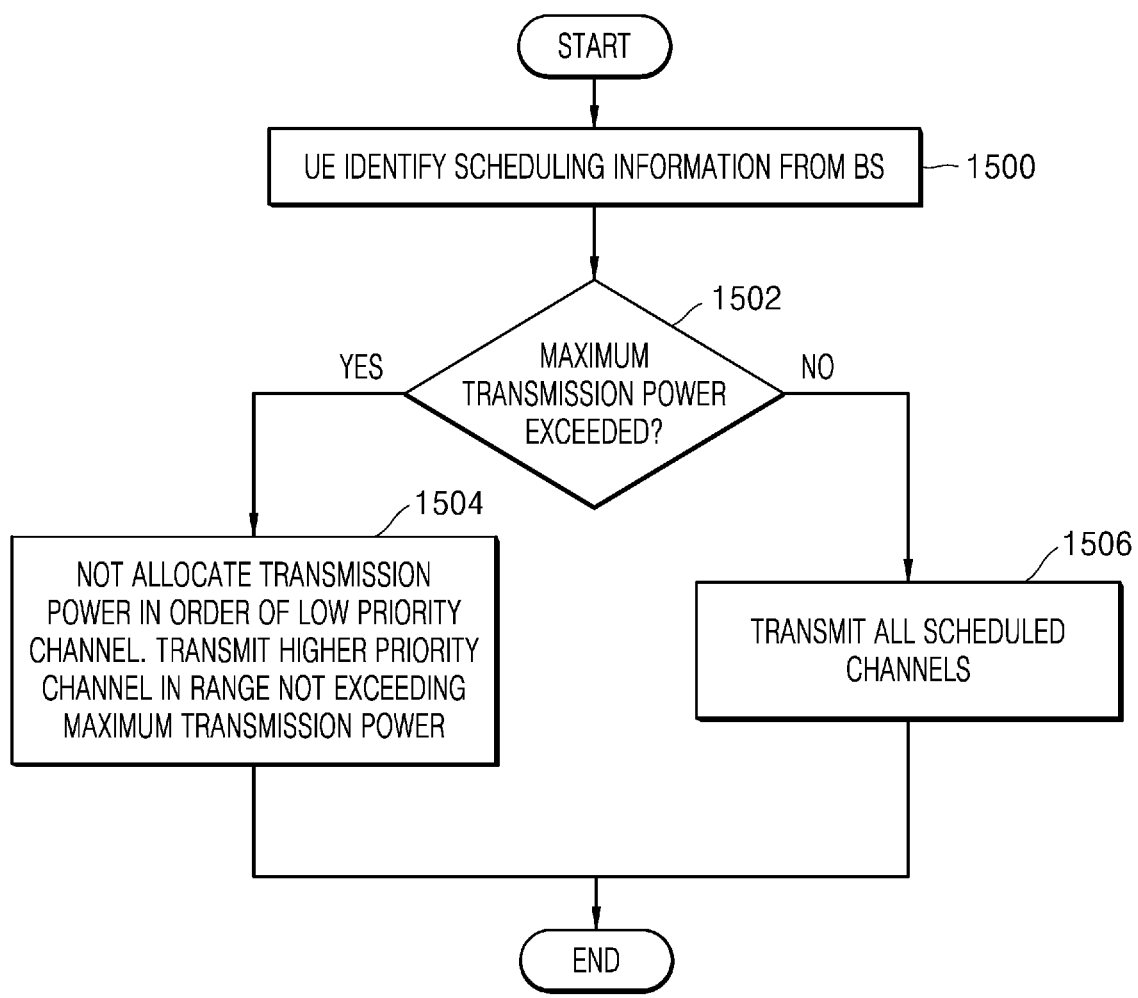
FIG. 15 is a flowchart illustrating a UE operation when a plurality of uplink channels are scheduled for different carriers, according to an embodiment of the disclosure.

FIG. 15 is a flowchart illustrating a UE operation when a plurality of UL channels are scheduled for different carriers, according to an embodiment of the disclosure.

The UE allocates transmission power according to the transmission power allocation order as described above in connection with FIG. 14.

First, in operation 1500, the UE may identify information scheduled by the BS over multiple carriers.

In operation 1502, to transmit UL channels scheduled at all carriers at a particular transmission time, the UE may determine whether a total sum of transmission power required exceeds the maximum UE transmission power.

In the negative case ('NO' in operation 1502), the UE may transmit all the scheduled channels in operation 1506.

In the positive case ('YES' in operation 1502), the UE in operation 1504 may perform transmission power allocation within a range that does not exceeds the maximum transmission power, according to the transmission power allocation priorities as described above with reference to Tables 7 and 8. From the BS perspective, it is difficult to correctly figure out whether the UE exceeds the maximum transmission power, so the BS receives UL channels scheduled for the UE over all the carriers. When a particular channel is not received, the UE may check and report a remaining amount of the UE transmission power to the BS in such an extra method as power headroom report (PHR), and the BS may naturally reflect the remaining power of the UE transmission power in scheduling.

Figure 16:
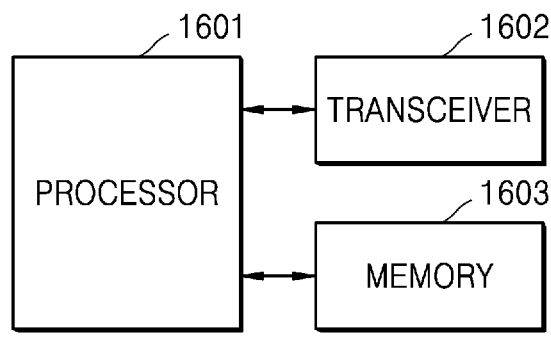
FIG. 16 is a schematic block diagram of a UE, according to an embodiment of the disclosure.

FIG. 16 is a schematic block diagram of a UE, according to an embodiment of the disclosure.

Referring to FIG. 16, the UE may include a processor 1601, a transceiver 1602, and a memory 1603. It is, of course, not limited thereto, and the UE may include more or fewer components than the components illustrated in FIG. 16. The processor 1601, the transceiver 1602 and the memory 1603 may be implemented in a single chip. In the disclosure, the processor 1601 may be defined to be a circuit, an application specific integrated circuit (ASIC), or at least one processor. It is, of course, not limited thereto.

The processor 1601 may control general operation of the UE. For example, the processor 1601 may control signal flows among the respective blocks to perform operation according to the aforementioned flowcharts. The processor 1601 may record data to the memory 1603 or read out data from the memory 1020. The processor 1601 may further perform functions of a protocol stack requested by a communication standard. For this, the processor 1601 may include at least one processor or microprocessor, or may be part of a processor. Furthermore, part of the transceiver 1602 and the processor 1601 may be referred to as a communication processor (CP).

The processor 1601 according to an embodiment of the disclosure may control operations of the UE as described above in connection with FIGS. 1 to 15.

In an embodiment of the disclosure, the processor 1601 may execute a program stored in the memory 1603 to receive configuration information relating to a type of a channel on which to transmit at least one UL control information and based on the received configuration information and a priority of the at least one UL control information, control the transceiver 1602 to transmit the at least one UL control information on at least one channel.

In an embodiment of the disclosure, the processor 1601 may execute the program stored in the memory 1603 to determine whether to simultaneously transmit a UL control channel and a UL data channel, receive scheduling information about at least one of at least one UL control channel or at least one UL data channel, identify whether time resources allocated for transmissions of the at least one UL control channel and the at least one UL data channel overlap, based on the scheduling information, determine one UL control channel and one UL data channel to be transmitted, based on a result of the determining and a result of the identifying, and control the transceiver 1602 to transmit the determined one UL control channel and one UL data channel.

In an embodiment of the disclosure, the transceiver 1602 may perform functions to transmit or receive a signal on a wireless channel. For example, the transceiver 1602 may perform a conversion function between a baseband signal and a bitstream according to a physical layer standard of the system. For example, for data transmission, the transceiver 1602 may generate complex symbols by encoding and modulating a bitstream for transmission. For data reception, the transceiver 1602 may reconstruct a received bitstream by demodulating and decoding the baseband signal. Furthermore, the transceiver 1602 may perform up-conversion on the baseband signal to a radio frequency (RF) band signal and transmit the resultant signal through an antenna, and may perform down-conversion on an RF band signal received through the antenna to a baseband signal. For example, the transceiver 1602 may include a transmit filter, a receive filter, an amplifier, a mixer, an oscillator, a digital-to-analog converter (DAC), an analog-to-digital converter (ADC), etc. The transceiver 1602 may also include a plurality of transmission and reception paths. Furthermore, the transceiver 1602 may include at least one antenna array comprised of a plurality of antenna elements. From the perspective of hardware, the transceiver 1602 may be comprised of a digital circuit and an analog circuit (e.g., a radio frequency integrated circuit (RFIC)). In this case, the digital circuit and the analog circuit may be implemented in a single package. The transceiver 1602 may also include a plurality of RF chains.

In an embodiment of the disclosure, the memory 1603 may store a basic program for operation of the UE, an application program, data like settings information. The memory 1603 may include a volatile memory, a non-volatile memory, or a combination of the volatile memory and the non-volatile memory. The memory 1603 may also provide the stored data at the request of the processor 1601. The memory 1603 may store at least one of information received or for transmission by the transceiver 1602 and information generated by the processor 1601.

Figure 17:
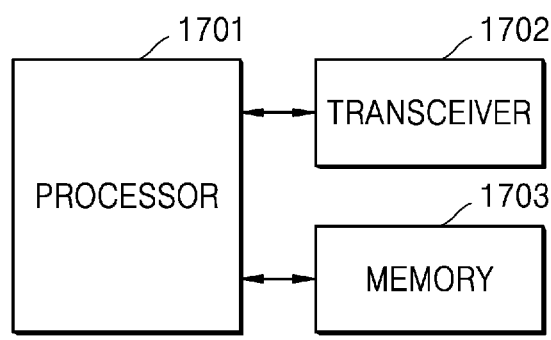
FIG. 17 is a schematic block diagram of a base station (BS), according to an embodiment of the disclosure.

FIG. 17 is a schematic block diagram of a BS, according to an embodiment of the disclosure.

Referring to FIG. 17, the BS may include a processor 1701, a transceiver 1702, and a memory 1703. It is, of course, not limited thereto, and the BS may include more or fewer components than the components illustrated in FIG. 17. The processor 1701, the transceiver 1702 and the memory 1703 may be implemented in a single chip. Herein, the processor may be defined to be a circuit, an ASIC, or at least one processor. It is, of course, not limited thereto.

In an embodiment of the disclosure, the processor 1701 may control general operation of the BS. For example, the processor 1701 may control signal flows among the respective blocks to perform operation according to the aforementioned flowcharts. The processor 1701 may record data to the memory 1703 or read out data from the memory 1020. The processor 1701 may further perform functions of a protocol stack requested by a communication standard. For this, the processor 1701 may include at least one processor or microprocessor, or may be part of a processor. Furthermore, part of the transceiver 1702 and the processor 1701 may be referred to as a communication processor (CP).

The processor 1701 according to an embodiment of the disclosure may control operations of the BS as described above in connection with FIGS. 1 to 15.

In an embodiment of the disclosure, the processor 1701 may execute a program stored in the memory 1703 to determine a type of a channel on which to transmit at least one UL control information, provide configuration information for a UE based on a result of the determining, and control the transceiver 1702 to receive at least one UL control information based on the configuration information. In an embodiment of the disclosure, the processor 1701 may execute a program stored in the memory 1703 to control the transceiver 1702 to transmit configuration information about whether to simultaneously transmit a UL control channel and a UL data channel, transmit configuration information about whether to piggyback and transmit UL control information on the UL data channel, transmit scheduling information about at least one of at least one UL control channel or at least one UL data channel, and receive one UL control channel and one UL data channel.

In an embodiment of the disclosure, the transceiver 1702 may perform functions to transmit or receive a signal on a wireless channel. For example, the transceiver 1702 may perform a conversion function between a baseband signal and a bitstream according to a physical layer standard of the system. For example, for data transmission, the transceiver 1702 may generate complex symbols by encoding and modulating a bitstream for transmission. For data reception, the transceiver 1702 may reconstruct a received bitstream by demodulating and decoding the baseband signal. Furthermore, the transceiver 1702 may perform up-conversion on the baseband signal to a radio frequency (RF) band signal and transmit the resultant signal through an antenna, and may perform down-conversion on an RF band signal received through the antenna to a baseband signal. For example, the transceiver 1702 may include a transmit filter, a receive filter, an amplifier, a mixer, an oscillator, a digital-to-analog converter (DAC), an analog-to-digital converter (ADC), etc. The transceiver 1702 may also include a plurality of transmission and reception paths. Furthermore, the transceiver 1702 may include at least one antenna array comprised of a plurality of antenna elements. From the perspective of hardware, the transceiver 1702 may be comprised of a digital circuit and an analog circuit (e.g., a radio frequency integrated circuit (RFIC)). In this case, the digital circuit and the analog circuit may be implemented in a single package. The transceiver 1702 may also include a plurality of RF chains.

In an embodiment of the disclosure, the memory 1703 may store a basic program for operation of the BS, an application program, data like settings information. The memory 1703 may include a volatile memory, a non-volatile memory, or a combination of the volatile memory and the non-volatile memory. The memory 1703 may also provide the stored data at the request of the processor 1701. The memory 1703 may store at least one of information received or for transmission by the transceiver 1702 and information generated by the processor 1701.

A scheduling method in a BS according to an embodiment of the disclosure may include determining a type of a channel on which to transmit at least one UL control information; providing configuration information for a UE based on a result of the determining; and receiving at least one UL control information based on the configuration information.

The determining of the type of a channel on which to transmit at least one UL control information may include determining at least one of the at least one UL control information to be transmitted on a UL control channel, and determining at least one of the at least one UL control information to be transmitted on a UL data channel.

The configuration information may be included in a certain field of DL control information, a resource in which to transmit the UL data channel may be determined based on time and frequency resource information in a PUCCH resource indicator (PRI) field, and configuration about frequency hopping, an HARQ process ID, NDI, MCS, or RV information for transmission of the UL data channel may be configured by information configured in advance by a higher layer signal.

The type of a channel on which to transmit the UL control information may be determined based on priority of the UL control information.

The priority of the UL control information may be determined based on a service type.

According to an embodiment of the disclosure, a method of transmitting UL control information in a UE may include receiving configuration information about a type of a channel on which to transmit at least one UL control information; and transmit the at least one UL control information on at least one channel based on priority of the at least one UL control information and the received configuration information.

The transmitting of the at least one UL control information on at least one channel based on priority of the at least one UL control information and the received configuration information may include, when two or more pieces of UL control information with the same priority are configured to be transmitted on respective UL control channels, multiplexing the two or more pieces of UL control information and transmitting a result of the multiplexing on one UL control channel.

The transmitting of the at least one UL control information on at least one channel based on priority of the at least one UL control information and the received configuration information may include, when two or more pieces of UL control information with different priorities are configured to be transmitted on respective UL control channels, transmitting the two or more pieces of UL control information on different UL control channels or transmitting only control information having highest priority.

The transmitting of the at least one UL control information on at least one channel based on priority of the at least one UL control information and the received configuration information may include transmitting at least one of the at least one UL control information on a UL control channel, and transmitting at least one of the at least one UL control information on a UL data channel.

The transmitting of the at least one UL control information on at least one channel based on priority of the at least one UL control information and the received configuration information may include, when two or more pieces of UL control information with the same priority are configured to be transmitted on a UL control channel and a UL data channel, respectively, multiplexing the two or more pieces of UL control information and transmitting a result of the multiplexing on one UL control channel.

A communication method in a UE according to an embodiment of the disclosure may include determining whether to simultaneously transmit a UL control channel and a UL data channel; receiving scheduling information about at least one of at least one UL control channel or at least one UL data channel; identifying whether time resources allocated for transmissions of the at least one UL control channel and the at least one UL data channel overlap, based on the scheduling information; determining one UL control channel and one UL data channel to be transmitted, based on a result of the determining and a result of the identifying; and transmitting the determined one UL control channel and one UL data channel.

The identifying of whether time resources allocated for transmissions of the at least one UL control channel and the at least one UL data channel overlap may include determining whether time resources allocated for transmission of the at least one UL control channel overlap, and determining whether time resources allocated for transmission of the at least one UL data channel overlap.

The transmitting of the determined one UL control channel and one UL data channel may include determining whether to piggyback and transmit UL control information on the one UL data channel.

Determining of whether to piggyback and transmit UL control information on the one UL data channel may be made based on at least one field of DL control information.

Determining of whether to piggyback and transmit UL control information on the one UL data channel may be made by further considering a result of the determining of whether the allocated time resources overlap.

At least one field of the DL control information may include a UL-SCH indicator field and a CSI request field.

Determining of the one UL control channel and one UL data channel to be transmitted, based on a result of the determining and a result of the identifying may include, when time resources allocated for transmission of a UL data channel with different priorities overlap, selecting a UL data channel having highest priority, when time resources allocated for transmission of a UL data channel with different priorities overlap, selecting a UL control channel having highest priority, and when pieces of UL control information included in a UL control channel are multiplexed on a UL data channel, dropping a UL control channel corresponding to the multiplexed UL control information.

UL control information corresponding to a UL control channel having highest priority may be transmitted by piggybacking itself on a UL data channel, and UL control information corresponding to a UL control channel having a priority other than the highest priority may not piggyback on the UL data channel.

Determining of whether to piggyback and transmit UL control information on the one UL data channel may be made based on at least one of a DL control information format, a type of the UL control information, the UL control channel, or priority of the DL control channel.

A communication method in a BS according to an embodiment of the disclosure may include transmitting configuration information about whether to simultaneously transmit a UL control channel and a UL data channel; transmitting configuration information about whether to piggyback and transmit UL control information on a UL data channel; transmitting scheduling information about at least one of at least one UL control channel or at least one UL data channel; and receiving one UL control channel and one UL data channel.

A BS according to an embodiment of the disclosure may include a transceiver, and a processor coupled with the transceiver and configured to determine a type of a channel on which to transmit at least one UL control information, provide configuration information for a UE based on a result of the determining, and receive at least one UL control information based on the configuration information.

A UE according to an embodiment of the disclosure may include a transceiver, and a processor coupled with the transceiver and configured to receive configuration information about a type of a channel on which to transmit at least one UL control information, and transmit the at least one UL control information on at least one channel based on priority of the at least one UL control information and the received configuration information.

A UE according to an embodiment of the disclosure may include a transceiver and a processor coupled with the transceiver and configured to determine whether to simultaneously transmit a UL control channel and a UL data channel, receive scheduling information about at least one of at least one UL control channel or at least one UL data channel, identify whether time resources allocated for transmissions of the at least one UL control channel and the at least one UL data channel overlap based on the scheduling information, determine one UL control channel and one UL data channel to be transmitted based on a result of the determining and a result of the identifying, and transmit the determined one UL control channel and one UL data channel.

A BS according to an embodiment of the disclosure may include a transceiver and a processor coupled with the transceiver and configured to transmit configuration information about whether to simultaneously transmit a UL control channel and a UL data channel, transmit configuration information about whether to piggyback and transmit UL control information on a UL data channel, transmit scheduling information about at least one of at least one UL control channel or at least one UL data channel, and receive one UL control channel and one UL data channel. A method performed by a UE according to an embodiment of the disclosure may include reporting UE capability for simultaneous transmission of one or more UL signals scheduled to overlap in time domain to a BS; receiving resource allocation information and priority information for a plurality of UL signals from the BS; identifying based on the resource allocation information whether a plurality of resources for the plurality of UL signals overlap in the time domain; and transmitting the plurality of UL signals to the BS at the same time based on the priority information and the UE capability when the plurality of resources overlap in the time domain.

In an embodiment of the disclosure, the reporting of the UE capability to the BS may include, when a resource of a UL control signal transmitted on a UL control channel and a resource of a UL data signal transmitted on a UL data channel having a higher priority than the UL control channel are allocated at the first carrier and the second carrier, respectively, to overlap in the time domain, reporting the BS of the UE capability indicating that the UE supports simultaneous transmission of the UL control signal and the UL data signal.

In an embodiment of the disclosure, the UE may support CA of the first carrier and the second carrier.

In an embodiment of the disclosure, the reporting of the UE capability to the BS may include, when a resource of a first UL control signal transmitted on a first UL control channel and a resource of a second UL control signal transmitted on a second UL control channel having a higher priority than the first UL control channel are allocated to overlap in the time domain, reporting the BS of the UE capability indicating that the UE supports simultaneous transmission of the first UL control signal and the second UL control signal.

In an embodiment of the disclosure, a resource of the first UL control signal and a resource of the second UL control signal may be allocated at the same carrier.

In an embodiment of the disclosure, the simultaneous transmitting of the plurality of UL signals to the BS may include, when a resource of the UL control signal and a resource of the UL data signal overlap in the time domain, transmitting the UL control signal and the UL data signal simultaneously at the first and second carriers, respectively, to the BS.

In an embodiment of the disclosure, the UL control signal may include response information confirming reception.

In an embodiment of the disclosure, the simultaneous transmitting of the plurality of UL signals to the BS may include, when a resource of the first UL control signal and a resource of the second UL control signal overlap in the time domain, transmitting the first UL control signal and the second UL control signal simultaneously to the BS.

In an embodiment of the disclosure, the transmitting of the first UL control signal and the second UL control signal simultaneously to the BS may include multiplexing the first UL control channel and the second UL control channel; and transmitting the first UL control signal and the second UL control signal simultaneously to the BS on the multiplexed UL control channel.

In an embodiment of the disclosure, the simultaneous transmitting of the plurality of UL signals to the BS may include, when one of a plurality of resources of UL control signals repeatedly transmitted at the first carrier on the UL control channel overlap a resource of UL data information transmitted on the UL data channel in the time domain, transmitting the UL control signal and the UL data information corresponding to the overlapping resource to the BS at the first and second carriers, respectively.

A method performed by a BS according to an embodiment of the disclosure may include receiving, from a UE, information about UE capability for simultaneous transmission of one or more UL signals scheduled to overlap in time domain; transmitting resource allocation information and priority information for a plurality of UL signals to the UE; and receiving the plurality of UL signals from the UE at the same time based on the priority information and the UE capability when a plurality of resources for the plurality of UL signals are identified as overlapping in the time domain based on the resource allocation information.

In an embodiment of the disclosure, the BS supports CA of a first carrier and a second carrier, and the receiving of the information about the UE capability from the UE may include, when a resource of a UL control signal transmitted on a UL control channel and a resource of a UL data signal transmitted on a UL data channel having a higher priority than the UL control channel are allocated at the first carrier and the second carrier, respectively, to overlap in the time domain, receiving, from the UE, the information about the UE capability indicating that the UE supports simultaneous transmission of the UL control signal and the UL data signal.

In an embodiment of the disclosure, the receiving of the information about the UE capability from the UE may include, when a resource of a first UL control signal transmitted on a first UL control channel and a resource of a second UL control signal transmitted on a second UL control channel having a higher priority than the first UL control channel are allocated to overlap in the time domain, receiving, from the UE, information about the UE capability indicating that the UE supports simultaneous transmission of the first UL control signal and the second UL control signal, wherein the resource of the first UL control signal and the resource of the second UL control signal may be allocated at the same carrier.

In an embodiment of the disclosure, the receiving of the plurality of UL signals simultaneous from the UE may include, when a resource of the UL control signal and a resource of the UL data signal overlap in the time domain, receiving the UL control signal and the UL data signal simultaneously at the first and second carriers, respectively, from the UE.

In an embodiment of the disclosure, the receiving of the plurality of UL signals simultaneous from the UE may include, when a resource of the first UL control signal and a resource of the second UL control signal overlap in the time domain, receiving the first UL control signal and the second UL control signal simultaneously from the UE on a multiplexed UL control channel.

A UE according to an embodiment of the disclosure may include a transceiver, and at least one processor coupled with the transceiver and configured to report UE capability for simultaneous transmission of one or more UL signals scheduled to overlap in time domain to a BS through the transceiver, receive resource allocation information and priority information for a plurality of UL signals from the BS through the transceiver, identify based on the resource allocation information whether a plurality of resources for the plurality of UL signals overlap in the time domain, and transmit the plurality of UL signals to the BS through the transceiver at the same time based on the priority information and the UE capability.

In an embodiment of the disclosure, the UE supports CA of a first carrier and a second carrier, and when a resource of a UL control signal transmitted on a UL control channel and a resource of a UL data signal transmitted on a UL data channel having a higher priority than the UL control channel are allocated at the first carrier and the second carrier, respectively, to overlap in the time domain, the at least one processor may report the UE capability indicating that the UE supports simultaneous transmission of the UL control signal and the UL data signal to the BS through the transceiver.

In an embodiment of the disclosure, when a resource of a first UL control signal transmitted on a first UL control channel and a resource of a second UL control signal transmitted on a second UL control channel having a higher priority than the first UL control channel are allocated to overlap in the time domain, the at least one processor may report UE capability indicating that the UE supports simultaneous transmission of the first UL control signal and the second UL control signal to the BS through the transceiver, wherein the resource of the first UL control signal and the resource of the second UL control signal may be allocated at the same carrier.

In an embodiment of the disclosure, when a resource of the UL control signal and a resource of the UL data signal overlap in the time domain, the at least one processor may transmit the UL control signal and the UL data signal simultaneously at the first and second carriers, respectively, to the BS through the transceiver.

In an embodiment of the disclosure, when a resource of the first UL control signal and a resource of the second UL control signal overlap in the time domain, the at least one processor may transmit the first UL control signal and the second UL control signal simultaneously to the BS through the transceiver on a multiplexed UL control channel.

In accordance with an embodiment of the disclosure, a method performed by a terminal in a wireless communication system is provided. The method may comprise: receiving, from a base station, information associated with simultaneous physical uplink control channel (PUCCH) and physical uplink shared channel (PUSCH) transmission; identifying that a PUCCH with a first priority index and a PUSCH with a second priority index overlap in a time domain; and in case that the first priority index is different from the second priority index, transmitting, to the base station, uplink control information (UCI) via the PUCCH and uplink data via the PUSCH, based on the information associated with the simultaneous PUCCH and PUSCH transmission.

In an embodiment, the method may further comprise in case that the first priority index is equal to the second priority index, multiplexing hybrid automatic repeat and request (HARQ-ACK) information of the PUCCH in the PUSCH.

In an embodiment, wherein the HARQ-ACK information is transmitted to the base station via the PUSCH and the PUCCH is dropped, based on the multiplexing.

In an embodiment, wherein the terminal supports the simultaneous PUCCH and PUSCH transmission across component carriers (CCs).

In an embodiment, the method may further comprise receiving, from the base station, information associated with multiplexing of UCI for overlapping of PUCCH or PUSCH transmissions with different priorities in the time domain.

In an embodiment, the method may further comprise: in case that a first PUCCH and a second PUCCH overlap in the time domain and the first PUCCH has a higher priority than the second PUCCH, multiplexing second UCI of the second PUCCH in the first PUCCH, based on the information associated with the multiplexing of the UCI; and transmitting first UCI of the first PUCCH and the second UCI to the base station via the first PUCCH, based on the multiplexing of the second UCI in the first PUCCH.

In an embodiment, wherein the terminal supports the multiplexing of the UCI for the overlapping of the PUCCH or PUSCH transmissions with different priorities in the time domain.

In accordance with an embodiment of the disclosure, a terminal in a wireless communication system is provided. The terminal may comprise: a transceiver; and at least one processor coupled to the transceiver and configured to: receive, from a base station via the transceiver, information associated with simultaneous physical uplink control channel (PUCCH) and physical uplink shared channel (PUSCH) transmission; identify that a PUCCH with a first priority index and a PUSCH with a second priority index overlap in a time domain; and in case that the first priority index is different from the second priority index, transmit, to the base station via the transceiver, uplink control information (UCI) via the PUCCH and uplink data via the PUSCH, based on the information associated with the simultaneous PUCCH and PUSCH transmission.

In an embodiment, wherein the at least one processor is further configured to in case that the first priority index is equal to the second priority index, multiplex hybrid automatic repeat and request (HARQ-ACK) information of the PUCCH in the PUSCH.

In an embodiment, wherein the HARQ-ACK information is transmitted to the base station via the PUSCH and the PUCCH is dropped, based on the multiplexing.

In an embodiment, wherein the terminal supports the simultaneous PUCCH and PUSCH transmission across component carriers (CCs).

In an embodiment, wherein the at least one processor is further configured to: receive, from the base station via the transceiver, information associated with multiplexing of UCI for overlapping of PUCCH or PUSCH transmissions with different priorities in the time domain.

In an embodiment, wherein the at least one processor is further configured to: in case that a first PUCCH and a second PUCCH overlap in the time domain and the first PUCCH has a higher priority than the second PUCCH, multiplex second UCI of the second PUCCH in the first PUCCH, based on the information associated with the multiplexing of the UCI; and transmit first UCI of the first PUCCH and the second UCI to the base station via the first PUCCH, based on the multiplexing of the second UCI in the first PUCCH.

In an embodiment, wherein the terminal supports the multiplexing of the UCI for the overlapping of the PUCCH or PUSCH transmissions with different priorities in the time domain.

In accordance with an embodiment of the disclosure, a method performed by a base station in a wireless communication system is provided. The method may comprise: transmitting, to a terminal, information associated with simultaneous physical uplink control channel (PUCCH) and physical uplink shared channel (PUSCH) transmission, wherein a PUCCH with a first priority index and a PUSCH with a second priority index overlap in a time domain; and in case that the first priority index is different from the second priority index, receiving, from the terminal, uplink control information (UCI) via the PUCCH and uplink data via the PUSCH, based on the information associated with the simultaneous PUCCH and PUSCH transmission.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. Each of the memories may be provided in the plural.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments have been described above, but a person of ordinary skill in the art will understand and appreciate that various modifications can be made without departing the scope of the disclosure. Thus, it will be apparent to those of ordinary skill in the art that the disclosure is not limited to the embodiments described, which have been provided only for illustrative purposes. Furthermore, the embodiments of the disclosure may be operated by being combined with one another when necessary. For example, parts of embodiment 1, embodiment 2, embodiment 2, and embodiment 3 of the disclosure may be combined to operate the BS and the UE. Although the embodiments of the disclosure are proposed based on NR systems, modifications to the embodiments of the disclosure, which do not deviate from the scope of the disclosure, may be applicable to other systems such as an FDD or TDD LTE system.

According to embodiments of the disclosure, efficient communication methods may be provided by simultaneously transmitting UL signals.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   transmitting, to a base station, capability information of the terminal, the capability information including information indicating that the terminal supports simultaneous physical uplink control channel (PUCCH) and physical uplink shared channel (PUSCH) transmissions of different priority across component carriers (CCs), and information indicating that the terminal supports multiplexing of hybrid automatic repeat and requests (HARQ-ACKs) with different priorities;
   receiving, from the base station, a radio resource control (RRC) message, wherein the RRC message includes information associated with enabling the simultaneous PUCCH and PUSCH transmissions, and information associated with enabling the multiplexing of the HARQ-ACKs with different priorities;
   in case that a first PUCCH with first HARQ-ACK information and a second PUCCH with second HARQ-ACK information overlap in a time domain and the first PUCCH has a higher priority than the second PUCCH, multiplexing the first HARQ-ACK information of the first PUCCH and the second HARQ-ACK information of the second PUCCH in a same PUCCH, based on the information associated with enabling the multiplexing of the HARQ-ACKs with different priorities; and
   in case that a PUCCH with a first priority index and a PUSCH with a second priority index that is different from the first priority index overlap in the time domain, the PUCCH with the first priority index being on a first cell and the PUSCH with the second priority index being on a second cell transmitting, to the base station, HARQ-ACK information via the PUCCH, and uplink data via the PUSCH, based on the information associated with the simultaneous PUCCH and PUSCH transmissions, wherein the first cell and the second cell are within a cell group.

2. The method of claim 1, further comprising:
   performing an operation related to resolving overlapping for PUCCH or PUSCH transmissions of a same priority index.

3. The method of claim 2, wherein the transmitting of the HARQ-ACK information and the uplink data is performed after performing the operation related to resolving the overlapping.

4. A terminal in a wireless communication system, the terminal comprising:
   a transceiver; and
   at least one processor coupled to the transceiver and configured to:
      transmit, to a base station via the transceiver, capability information of the terminal, the capability information including information indicating that the terminal supports simultaneous physical uplink control channel (PUCCH) and physical uplink shared channel (PUSCH) transmissions of different priority across component carriers (CCs), and information indicating that the terminal supports multiplexing of hybrid automatic repeat and requests (HARQ-ACKs) with different priorities,
      receive, from the base station via the transceiver, a radio resource control (RRC) message, wherein the RRC message includes information associated with enabling the simultaneous PUCCH and PUSCH transmissions, and information associated with enabling the multiplexing of the HARQ-ACKs with different priorities,
      in case that a first PUCCH with first HARQ-ACK information and a second PUCCH with a second HARQ-ACK information overlap in a time domain and the first PUCCH has a higher priority than the second PUCCH, multiplex the first HARQ-ACK information of the first PUCCH and the second HARQ-ACK information of the second PUCCH in a same PUCCH, based on the information associated with enabling the multiplexing of the HARQ-ACKs with different priorities, and
      in case that a PUCCH with a first priority index and a PUSCH with a second priority index that is different from the first priority index overlap in the time domain, the PUCCH with the first priority index being on a first cell and the PUSCH with the second priority index being on a second cell,
      transmit, to the base station via the transceiver, HARQ-ACK information via the PUCCH and uplink data via the PUSCH, based on the information associated with the simultaneous PUCCH and PUSCH transmissions, wherein the first cell and the second cell are within a cell group.

5. The terminal of claim 4, wherein the at least one processor is further configured to:
   perform an operation related to resolving overlapping for PUCCH or PUSCH transmissions of a same priority index.

6. The terminal of claim 5, wherein the HARQ-ACK information and the uplink data are transmitted after performing the operation related to resolving the overlapping.

7. A method performed by a base station in a wireless communication system, the method comprising:
   receiving, from a terminal, capability information of the terminal, the capability information including information indicating that the terminal supports simultaneous physical uplink control channel (PUCCH) and physical uplink shared channel (PUSCH) transmissions of different priority across component carriers (CCs), and information indicating that the terminal supports multiplexing of hybrid automatic repeat and requests (HARQ-ACKs) with different priorities;
   transmitting, to the terminal, a radio resource control (RRC) message, wherein the RRC message includes information associated with enabling the simultaneous PUCCH and PUSCH transmissions, and information associated with enabling the multiplexing of the HARQ-ACKs with different priorities, wherein in case that a first PUCCH with first HARQ-ACK information and a second PUCCH with second HARQ-ACK information overlap in a time domain and the first PUCCH has a higher priority than the second PUCCH, the first HARQ-ACK information of the first PUCCH and the second HARQ-ACK information of the second PUCCH are multiplexed in a same PUCCH, based on the information associated with enabling the multiplexing of the HARQ-ACKs with different priorities; and in case that a PUCCH with a first priority index and a PUSCH with a second priority index that is different from the first priority index overlap in the time domain, the PUCCH with the first priority index being on a first cell and the PUSCH with the second priority index being on a second cell, receiving, from the terminal, HARQ-ACK information via the PUCCH, and uplink data via the PUSCH, based on the information associated with the simultaneous PUCCH and PUSCH transmissions, wherein the first cell and the second cell are within a cell group.

8. A base station in a wireless communication system, the base station comprising:

a transceiver; and at least one processor coupled to the transceiver and configured to:

receive, from a terminal via the transceiver, capability information of the terminal, the capability information including information indicating that the terminal supports simultaneous physical uplink control channel (PUCCH) and physical uplink shared channel (PUSCH) transmissions of different priority across component carriers (CCs), and information indicating that the terminal supports multiplexing of hybrid automatic repeat and requests (HARQ-ACKs) with different priorities, transmit, to the terminal via the transceiver, a radio resource control (RRC) message, wherein the RRC message includes information associated with enabling the simultaneous PUCCH and PUSCH transmissions, and information associated with enabling the multiplexing of the HARQ-ACKs with different priorities, wherein in case that a first PUCCH with first HARQ-ACK information and a second PUCCH with second HARQ-ACK information overlap in a time domain and the first PUCCH has a higher priority than the second PUCCH, the first HARQ-ACK information of the first PUCCH and the second HARQ-ACK information of the second PUCCH are multiplexed in a same PUCCH, based on the information associated with enabling the multiplexing of the HARQ-ACKs with different priorities, and in case that a PUCCH with a first priority index and a PUSCH with a second priority index that is different from the first priority index overlap in the time domain, the PUCCH with the first priority index being on a first cell and the PUSCH with the second priority index being on a second cell, receive, from the terminal via the transceiver, HARQ-ACK information via the PUCCH, and uplink data via the PUSCH, based on the information associated with the simultaneous PUCCH and PUSCH transmissions, wherein the first cell and the second cell are within a cell group.

* * * * *